(12) United States Patent
Katsandres et al.

(10) Patent No.: US 6,356,949 B1
(45) Date of Patent: Mar. 12, 2002

(54) AUTOMATIC DATA COLLECTION DEVICE THAT RECEIVES DATA OUTPUT INSTRUCTION FROM DATA CONSUMER

(75) Inventors: James T. Katsandres, Seattle; Jeffrey M. Hunt, Everett; Chau Minh Ho, Edmonds; Paul David Shoeman, Lynnwood, all of WA (US)

(73) Assignee: Intermec IP Corp., Beverly Hills, CA (US)

(*) Notice: Subject to any disclaimer, the term of this patent is extended or adjusted under 35 U.S.C. 154(b) by 0 days.

(21) Appl. No.: 09/240,303

(22) Filed: Jan. 29, 1999

(51) Int. Cl.$^7$ .................................................. G06F 15/173
(52) U.S. Cl. ........................ 709/238; 709/217; 709/203
(58) Field of Search ................................ 709/238, 201, 709/203, 217, 218, 219; 370/351, 401, 409, 911; 235/462.07; 455/445

(56) References Cited

U.S. PATENT DOCUMENTS

| | | | |
|---|---|---|---|
| 4,801,786 A | 1/1989 | Stobbe | 235/377 |
| 4,825,058 A | 4/1989 | Poland | 235/472 |
| 4,831,539 A * | 5/1989 | Hagenbuch | 340/988 |
| 5,034,598 A | 7/1991 | Poland | 235/435 |
| 5,052,020 A | 9/1991 | Koenck et al. | 375/62 |
| 5,070,536 A | 12/1991 | Mahany et al. | 455/67 |
| 5,121,342 A | 6/1992 | Szymborski et al. | 364/514 |
| 5,218,188 A | 6/1993 | Hanson | 235/375 |
| 5,261,079 A | 11/1993 | Celi, Jr. | 395/500 |
| 5,295,154 A | 3/1994 | Meier et al. | 375/1 |
| 5,309,351 A | 5/1994 | McCain et al. | 364/132 |
| 5,322,991 A | 6/1994 | Hanson | 235/472 |
| 5,349,678 A | 9/1994 | Morris et al. | 395/800 |
| 5,365,546 A | 11/1994 | Koenck et al. | 375/9 |
| 5,404,493 A | 4/1995 | Bolme et al. | 395/500 |
| 5,418,684 A | 5/1995 | Koenck et al. | 361/680 |
| 5,425,051 A | 6/1995 | Mahany | 375/202 |
| 5,440,564 A | 8/1995 | Ovada et al. | 370/112 |
| 5,471,596 A | 11/1995 | Brown, III | 395/375 |
| 5,572,512 A | 11/1996 | Cutler, Jr. et al. | 370/13 |
| 5,577,229 A | 11/1996 | Wakerly | 395/474 |
| 5,586,281 A | 12/1996 | Miyama et al. | 395/405 |
| 5,604,516 A | 2/1997 | Herrod et al. | 345/168 |
| 5,623,603 A | 4/1997 | Jiang et al. | 395/200.04 |
| 5,666,645 A * | 9/1997 | Thomas et al. | 455/6.1 |
| 5,790,536 A * | 8/1998 | Mahany et al. | 370/338 |
| 6,006,100 A * | 12/1999 | Loenck et al. | 455/466 |
| 6,119,941 A * | 9/2000 | Katsandres et al. | 235/462.07 |

OTHER PUBLICATIONS

Palmer, Roger C. "Reading, Printing and Specification of Bar Code Symbols," *The Bar Code Book*, 2nd ed., Helmers Publishing, Inc., Peterborough, New Hampshire, 1991, p. 107.

* cited by examiner

Primary Examiner—Mehmet B. Geckil
(74) *Attorney, Agent, or Firm*—Seed IP Law Group, PLLC

(57) ABSTRACT

A method and system for receiving a client's instructions with regard to specifying an output mechanism and a data type for data received from an automatic data collection ("ADC") device on an ADC device platform. The method and system allows client applications to register their ADC data requests in a grid that is referenced during the processing of received ADC data. Clients, residing either on the ADC device platform or on a remote computing system, register with a data transfer mechanism to receive data via a particular output mechanism. Following registration of a client's preferred output mechanism, the data transfer mechanism forwards all data received for the client by the ADC device platform to the client's specified output mechanism. Using the data transfer mechanism, the same set of input data, destined for more than one application, may be simultaneously transmitted over different output mechanisms. The invention may utilize data output mechanisms such as pipes, remote procedure calls ("RPC"), sockets, stream files, NetBIOS, mail slots, NetDDE, and shared memory. The invention further allows the updating of existing data output grids or the addition of new information in data grids in association with a newly added ADC device, a newly added output condition, or a newly added client.

46 Claims, 14 Drawing Sheets

AUTOMATIC DATA COLLECTION DEVICE THAT RECEIVES DATA OUTPUT INSTRUCTION FROM DATA CONSUMER

TECHNICAL FIELD

The invention relates generally to automatic data collection ("ADC") devices and more particularly to receiving instructions from ADC data consumers regarding data output, including instructions specifying a data output mechanism and specifying the characteristics of the data to be routed through the selected data output mechanism.

BACKGROUND OF THE INVENTION

Automatic Data Collection ("ADC") device platforms, such as ADC device platforms equipped with bar code readers, have received increasing commercial attention in the past few years. ADC device platforms, such as handheld data collection terminals, or hand-held personal computers, have been widely implemented in the retail marketplace and have garnered increasing utilization in a diverse range of application areas. The ever-decreasing cost and size of ADC device platforms has facilitated their entry into a wide variety of commercial, institutional, and governmental settings.

An ADC device platform having a bar code reader adeptly accesses and retrieves data stored in the form of a bar code label. Data representing virtually any product or service found in the stream of commerce may be encoded in a bar code label for later access by an ADC device platform having a bar code reader. Bar code readers include laser scanners as well as other means of collecting product information, such as a bar code wand, a still camera or an area imager. In addition to bar code labels, other ADC data formats include Radio Frequency ("RF") tags, resonators, SmartCards, magnetic strips, Optical Character Recognition ("OCR"), speech input, two-dimensional ("2D") symbols, dipole devices (such as those recited in U.S. Pat. No. 5,581,257), and any symbol having encoded data therein.

In a conventional ADC device platform environment, the recipient of ADC data either physically manipulates the ADC device platform itself to retrieve the ADC data or receives the ADC data through a local, and probably proprietary, network. Thus, a typical ADC device operator is limited both in terms of the distance from which the operator may be located away from the actual device and by the complexity and versatility of the elements that comprise the ADC device network which the operator utilizes. The operator suffers from still further limitations due to the fact that many conventional ADC device platforms are not readily configurable for new ADC devices, or even for ADC devices other than those attached to the ADC device platform when it is initially sold. Yet another limitation in a conventional ADC device platform arises when an operator wishes to add a new ADC device to one of the few ADC device platforms that will accept new ADC devices. This limitation stems from the fact that many ADC devices require proprietary communications protocols, and even when the communications protocols are non-proprietary, the communications protocols are typically non-standard. Thus, the operator cannot simply attach a new ADC device to an existing ADC device platform and expect that the new combination will function properly. Finally, the above limitations, both separately and together, hinder an ADC operator's ability to customize the ADC device platform to operate in the most productive possible manner.

Input data received by an ADC device platform must be routed to the intended destination. Conventional ADC device platforms typically have a simple connection that routes one type of data from a single ADC device to a single destination, typically an application program. However, ADC data consumers presently demand sophisticated and customizable ADC device platforms. In addition, consumers expect their ADC device platforms to be reconfigurable for new ADC devices and new data-receiving applications. Many ADC data consumers also need their ADC device platform to process ADC data without requiring modification of destination applications, which are frequently provided by third parties and cannot be modified without the cooperation and permission of the producer and owner.

A single ADC device may transmit data having a variety of characteristics into an ADC device platform. As ADC device platforms become more adept at receiving data from a variety of ADC devices, efficient mechanisms for routing ADC data become increasingly critical to the overall success of the ADC device platform. Moreover, an application program may request ADC data having characteristics that may potentially arise in the ADC data retrieved by more than one ADC device. While routing decisions may be permanently fixed in an ADC device platform's basic design, such an approach provides only minimal flexibility and does not accommodate the addition of new ADC devices and new applications.

In prior art ADC device platforms, the ADC device platform typically receives input data from a single ADC device, performs minimal processing on the data, then routes the data to a single destination application. While this design might have been adequate in the past, this design is wholly deficient for the modern data collection environment in which multiple ADC devices provide data to an ADC device platform that then forwards the data to one or more applications. In addition, different applications, for a variety of reasons, may operate more efficiently when they receive data from one particular output mechanism as opposed to another output mechanism. Accordingly, ADC data consumers require increased flexibility regarding the output mechanism available for data output from an ADC device platform.

SUMMARY OF THE INVENTION

The invention provides a method and system for receiving a client's instructions with regard to routing data to the client from one or more automatic data collection ("ADC") devices in an ADC device platform.

An aspect of the invention allows client applications to register a request ADC data type in a grid that operates as a data filter. For example, a client may use the grid to request all ADC data received from any ADC device on an ADC device platform when the ADC data has been encoded in a particular data type. Similarly, a client may request one or more data types that may be produced by a specific ADC device.

Another aspect of the invention provides a data transfer mechanism that performs simultaneous data transmission from an ADC device platform over different output mechanisms to reach multiple clients. Clients, residing either on the ADC device platform or on a remote computing system, register with a data output grid to receive data via a particular output mechanism. Following registration of a client's preferred output mechanism, a data transfer mechanism forwards all data received by the ADC device platform to the client using the output mechanism specified in the data output grid. Using the data transfer mechanism, the same set of input data, destined for more than one application, may be simultaneously transmitted to different output mechanisms.

Thus, the data transfer mechanism eliminates a potential data communications bottleneck in a multiple client environment. The invention may utilize an unlimited number of data output mechanisms, including pipes, remote procedure calls ("RPC"), sockets, stream files, the network Basic Input/Output System ("NetBIOS"), mail slots, the network Dynamic Data Exchange ("NetDDE"), and shared memory.

ADC devices accommodated by the invention include bar code readers, speech recognition systems, RF tag readers, resonators, SmartCards, two-dimensional data readers, ASCII data devices, AIMI-EIC data devices, dipole device readers, and optical character recognition ("OCR") systems. The invention further allows the updating of existing data output grids or the addition of new information in data grids in association with a newly added ADC device, a newly added output condition, or a newly added client. Similarly, the invention allows the data output grid to be modified to accept a new ADC device, a new output mechanism, or a new client.

BRIEF DESCRIPTION OF THE DRAWINGS

An exemplary embodiment of the invention will be described below relative to the following figures. Note that similar elements and steps in the figures have the same reference number. For ease in identifying the discussion of any particular element, the most significant digit in a reference number refers to the figure number in which that element is first introduced (e.g., element 204 is first introduced and discussed with respect to FIG. 2).

DETAILED DESCRIPTION OF THE INVENTION

Figure 1:
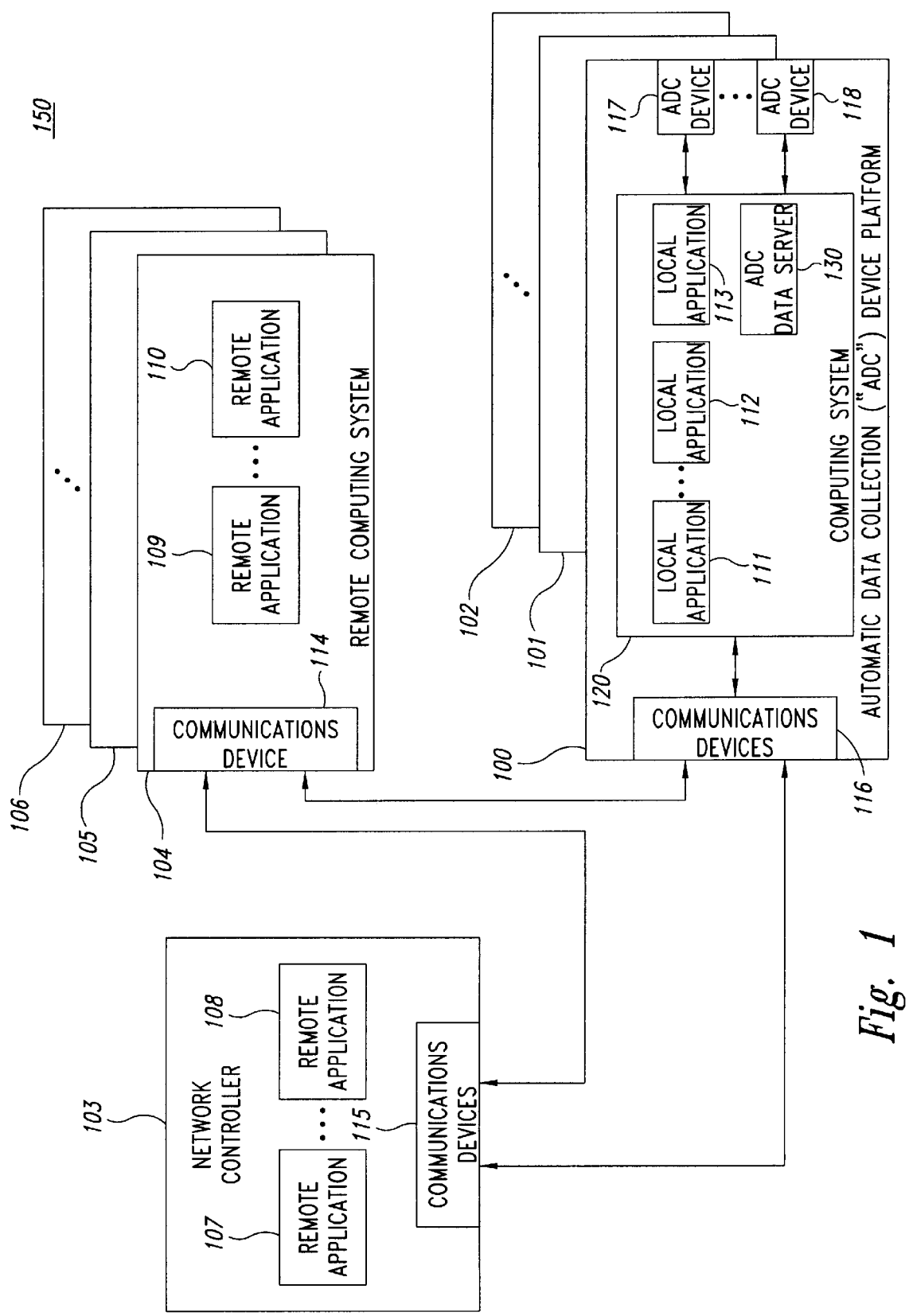
FIG. 1 depicts an ADC network 150 comprising a network controller 103, remote computing systems 104–106, and ADC device platforms 100–102 through which ADC data may be directed by one embodiment of the invention.

The invention provides a method and system for receiving instructions regarding transmitting data from one or more automatic data collection ("ADC") devices in an ADC device platform to one or more destinations. The invention allows an application program to indicate the types of data it should receive and to specify an output mechanism for routing input data for the application to an appropriate destination. The invention further allows applications to specialize their data requests and process all data of a given type, without regard for the ADC device from which the data has been retrieved. The invention additionally provides an efficient mechanism for changing the routing of data to an application. The invention utilizes a data output grid that retains instructions regarding the output of data to an application. The invention further allows the updating of a data output grid and the addition of new information in the data output grid in association with a newly added ADC device, a newly added output condition, or a newly added application.

An aspect of the invention provides a method and system for allowing client applications to register their ADC data requests in an ADC grid that operates as a data filter. The invention also allows client applications to register instructions such as whether ADC data output to the client application requires virtual wedging or dynamic wedging and under what circumstances such wedging will be required. The invention may operate as an application programming interface ("API") that channels ADC data to client applications based upon information in the ADC grid, according to one embodiment of the invention. For example, a client may request all ADC data received from one or more ADC devices on an ADC device platform when the ADC data has been encoded in the Code 39 bar code symbology. Similarly, a client may request all of the ADC data from a specific ADC device but also specify that all transmitted data be formatted as keyboard input, thus signaling the API to route the data through a virtual wedge, according to an embodiment of the invention.

Another aspect of the invention provides a data transfer mechanism that allows simultaneous transmission of data from an ADC device platform over different output mechanisms to reach various client applications. Client applications, residing either on the ADC device platform or residing on a remote computing system, may register with the data transfer mechanism to receive data via a specific output mechanism. According to one embodiment of the invention, the data transfer mechanism operates in conjunction with a data output grid, or output filter, to allow client applications to register their output mechanism selections.

The data transfer mechanism obviates the need to buffer data while waiting to send it to client applications because all client applications receive the data at the same time, according to one embodiment of the invention. Thus, the data transfer mechanism eliminates data communication bottlenecks wherever possible, enabling more efficient utilization of system resources. The invention may utilize data output mechanisms such as pipes, remote procedure calls ("RPC"), sockets, stream files, network Basic Input/Output System ("NetBIOS"), mail slots, network Dynamic Data Exchange ("NetDDE"), and shared memory. Following registration of a client's preferred output mechanism, the data transfer mechanism forwards all data received by the ADC device platform to the specified mechanism registered for a client.

FIG. 1 depicts an ADC network 150 comprising a network controller 103, remote computing systems 104–106, and ADC device platforms 100–102 through which ADC data may be directed by one embodiment of the invention. The ADC network 150 may comprise additional remote computing systems, as indicated by the ellipsis between the remote computing system 105 and the remote computing system 106. The ADC network 150 may also comprise fewer than three remote computing systems in some embodiments. In addition, the ADC network 150 may comprise additional ADC device platforms, as indicated by the ellipsis between the ADC device platform 101 and the ADC device platform 102. The ADC network 150 may also comprise fewer than three ADC device platforms in some embodiments.

Using the ADC network 150, a remote operator at the remote computing system 104, for example, may receive data from ADC devices on the ADC device platform 100, such as an ADC device 117, an ADC device 118, or from both the ADC devices 117, 118 concurrently. A local operator at an ADC device platform, such as the ADC device platform 100, may similarly receive data from the ADC devices 117, 118. The ADC network 150 also allows an operator to control characteristics of the ADC platform 100 and any configurable subsystems on the ADC device platform 100. An operator may perform file transfers, view files, provide firmware upgrades and review graphically-represented unit performance statistics using the ADC network 150. An operator may also view a map of all ADC device platforms 100–102 in the ADC network 150 and their current status.

The remote computing systems in the ADC network 150, such as the remote computing system 104, comprise a communications device 114, and remote applications 109, 110. The ellipsis between the remote application 109 and the remote application 110 indicates that the remote computing system 104 may contain more than two remote applications. The remote computing system 104 may be a Windows95-equipped personal computer ("PC"), a UNIX workstation, an IBM host computer, a WindowsCE-equipped hand-held computer, or any computing system capable of performing the tasks described herein. The Microsoft Corporation produces the Windows95 and WindowsCE operating systems.

The remote application 109 on the remote computing system 104 may include a browsing capability that facilitates data communication with the ADC device platform 100 over the ADC network 150. The ADC device platform 104, for example, may have a uniform resource locator ("URL") that facilitates communication between the ADC device platform 104 and the remote application 109. The remote web browser may host Java applets that coordinate data transfer from an ADC device on the ADC device platform 100 to the remote computing system 104. The remote computing system 104 may receive the Java applets from a variety of sources, including the ADC device platform 100 itself. The remote application 109 may also communicate with the ADC device platform 100 using other communications methods.

The network controller 103 includes communications devices 115, and the remote applications 107–108. The ellipsis between the remote application 107 and the remote application 108 indicates that the network controller 103 may contain more than two remote applications. In addition, the network controller 103 may contain fewer than two remote applications in some embodiments. The network controller 103 further includes applications that configure and manage the ADC device platforms 100–102 and the elements comprising the ADC device platforms 100–102. The remote computing systems 104–106 also may configure the ADC device platforms 100–102, either directly or indirectly via the network controller 103. An exemplary system and method for managing and configuring ADC device platforms is described in a provisional patent application entitled "Automatic Data Collection Device Having A Network Communications Capability," U.S. Provisional Application No. 60/084,272, filed on May 4, 1998, and assigned to a common assignee.

An exemplary ADC device platform, such as the ADC device platform 100, includes communications devices 116, a computing system 120, and the ADC devices 117, 118. The ADC device platform 100 may comprise more than two ADC devices as indicated by the ellipsis between the ADC device 117 and the ADC device 118. The ADC devices 117, 118 may comprise, for example, bar code readers, radio frequency ("RF") tag readers, resonators, SmartCard readers, magnetic stripe readers, optical character recognition ("OCR") readers, text-to-speech devices, speech input recognizing devices, two-dimensional data readers, dipole device readers, and all other forms of scanning or imaging devices. AIMI-ECI ("extended channel interpretation") utilizes symbol value ranges (e.g., the range 00000 to 811,799) that represent particular classes of items (e.g., retail merchandise). An exemplary RF tag reader suitable for use in the ADC device platform 100 is described in U.S. application Ser. No. 08/771,320, entitled, "Automatic Mode Detection and Conversion System for Printers and Tag Interrogators," filed on Apr. 27, 1998 and assigned to a common assignee. The ADC device 117 may be a different type of, or the same as, the ADC device 118.

The computing system 120 in the ADC device platform 100 may utilize any suitable operating system. In a preferred embodiment, the computing system utilizes a WindowsCE operating system. The computing system 120 includes local applications 111–113 and an ADC data server 130. The computing system 120 may include more than three local applications, as indicated by the ellipsis between the local application Ill and the local application 112. Embodiments of the computing system 120 may contain fewer than three local applications.

The ADC data server 130 performs tasks such as managing multiple local and network ADC applications and collecting, filtering, buffering, and distributing data from multiple ADC devices to multiple clients such as the local application 111 and the remote application 109. The ADC data server 130 provides device-independent logical connections between client applications, such as the local applications 111–113 and the remote applications 107–110, for data communication with the ADC devices 117, 118. At the request of client applications, the ADC data server 130 collects data from the ADC devices 117, 118 and distributes it to the clients while also allowing the clients to write instructions regarding the disposition of data received from the ADC devices 117, 118.

A remote client, such as the remote application 107, is an ADC client running on a computing system other than the computing system 120. If the computing system 120 uses the WindowsNT or Windows98 operating systems then "DCOM" may be used to communicate to the ADC data server 130, according to an embodiment of the invention. DCOM, or "Distributed Component Object Model," stipulates how software components, or small, reusable programming elements, communicate over Windows-based networks and permits the distribution of different components for a single application across two or more networked computers, such as the computing system 120 and the remote computing system 104, such that distribution of the components is not apparent to the user.

If the computing system uses a non-Windows operating system, then a TCP/IP sockets interface will be used. Sockets provide an identifier for a particular service on a particular node of a network. The socket consists of a node address and a port number that identifies the service. The Transmission Control Protocol ("TCP"), governs the break up of data messages into packets to be sent via the Internet Protocol ("IP") and the reassembly and verification of the complete messages from packets received. The ADC data server 130 allows multiple clients, such as the remote application 109 and the local application 111, to access multiple ADC devices without burdening these client applications with an understanding of the low level ADC device protocols or how to share access to multiple ADC devices.

The ADC data server 130 operates in conjunction with ADC protocol handlers and ADC device handlers. ADC protocol handlers and ADC device handlers encapsulate ADC device management, so adding a new ADC device to the ADC device platform 100 does not require modifications to the ADC data server 130. The ADC data server 130 may also communicate with a reader command gateway to provide commands for the ADC devices, according to an embodiment of the invention. (As will be discussed below in FIG. 2, the ADC device handler may also communicate with a reader command gateway to provide commands for the ADC devices.) The ADC data server 130 further notifies ADC devices, such as the ADC devices 117 and 118, when their configuration has changed to support on-the-fly configuration changes. The local applications 111–113 and the remote applications 107–110 may send operational and configuration commands to the ADC devices 117, 118.

Figure 2:
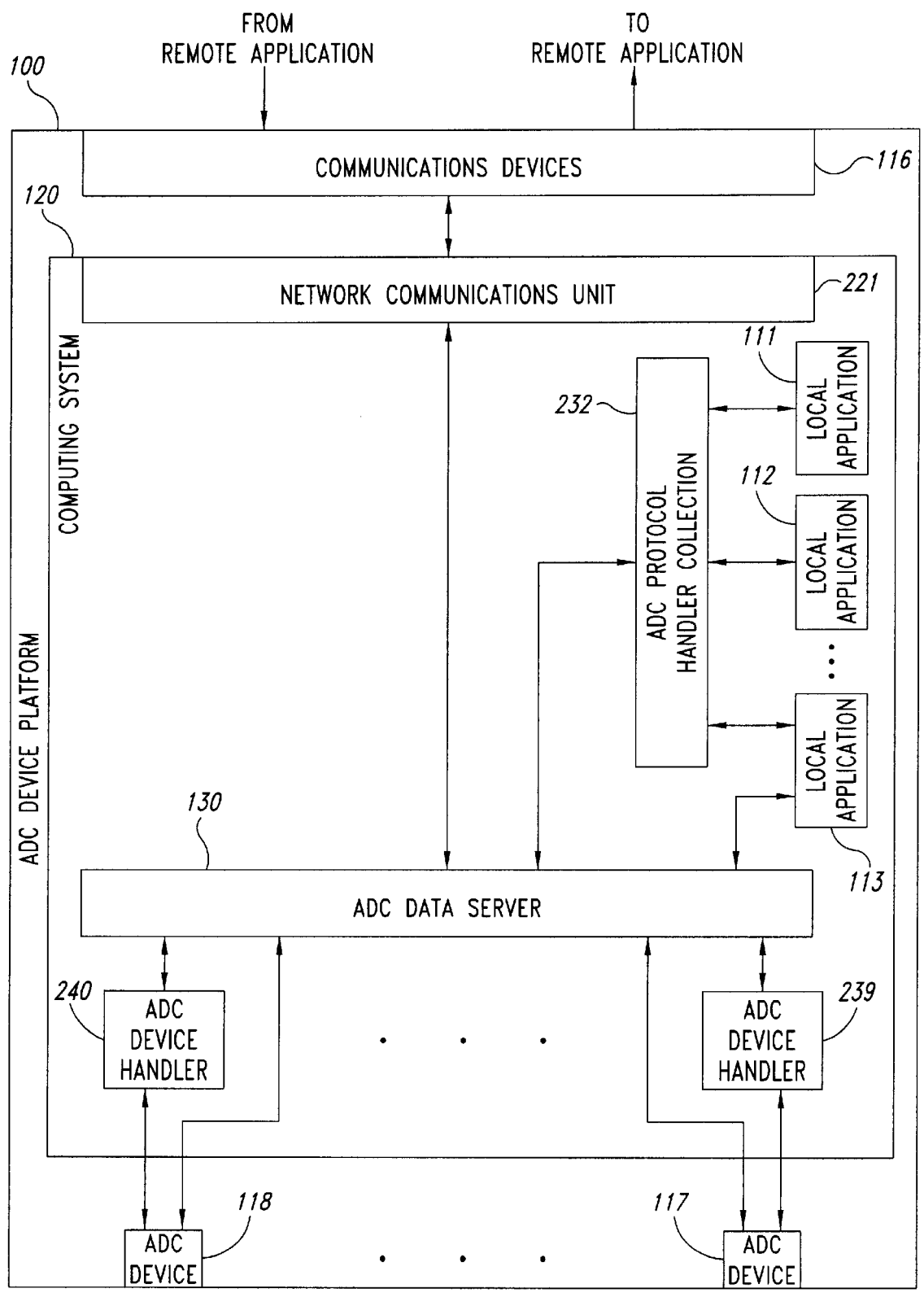
FIG. 2 provides a more detailed illustration of the computing system 120 in the ADC device platform 100, according to one exemplary embodiment of the invention.

FIG. 2 provides a more detailed illustration of the computing system 120 in the ADC device platform 100, according to an exemplary embodiment of the invention. The computing system 120 enables applications, such as the remote application 107 and the local application 111, to communicate with and access data from ADC devices, such as the ADC device 117. The computing system 120 further enables applications to register their ADC and data requests and output mechanism requests. The computing system 120 may comprise the ADC data server 130, an ADC protocol handler collection 232, ADC device handlers 239, 240, and a network communications unit 221, according to an embodiment of the invention.

The ADC data server 130 communicates with remote ADC clients, such as the remote application 109, through the network communications unit 221. In a preferred embodiment, remote ADC clients communicate with the ADC data server 130 using the Winsock 1.1 socket's interface over TCP/IP. Winsock is an API that provides a TCP/IP socket interface in the Windows operating system. Embodiments of the network communications unit 221 may utilize a variety of communications methods in communicating with remote applications, including sockets, TCP/IP, UDP, and UDP+. The Transmission Control Protocol ("TCP"), governs the break up of data messages into packets to be sent via the Internet Protocol ("IP") and the reassembly and verification of the complete messages from packets received.

The User Datagram Protocol ("UDP") is a connectionless protocol parallel to TCP in the IP communication stack. UDP converts data messages generated by an application into packets to be sent via IP, but does not verify that the messages have been delivered correctly. Therefore, UDP is more efficient than TCP, although the reliability of UDP depends on the application generating the message. UDP+ provides additional functionality that is not provided by UDP, such as guaranteed packet delivery and packet ordering. The ADC data server 130 supports all physical communication methods provided by TCP/IP, UDP, and UDP+ such as serial communication and Infrared Data Association ("IRDA") standard communication. UDP+is further described in U.S. application Ser. No. 08/852,002, entitled, "Reliable Communication over an Unreliable Transport Layer in a Hand-Held Device using User-Configurable Timers," is also described in U.S. application Ser. No. 08/851,848, "Providing Reliable Communication over an Unreliable Transport Layer in a Hand-Held Device using a Persistent Session," both filed on May 6, 1997 and assigned to a common assignee.

After a successful connection with a client application, including both local and remote applications, the ADC data server 130 dedicates resources to handle all communications to the client application, ensuring that communication problems with one client will not affect other remote or local clients. In one embodiment, the communication scheme utilized between the remote applications, such as the remote application 109, and the ADC data server 130, provides a variable length, packet message format. A client, such as the remote application 109, performs a first read to determine the message length. The client next allocates a sufficiently large buffer to hold the response and performs a second read to retrieve the rest of the message.

If communication errors occur while the ADC data server 130 communicates with a client, such as the remote application 109, the ADC data server 130 tries to re-establish communication before closing the connection. After closing the connection, the ADC data server 130 maintains the client data and resources for a user-configurable time period so that the client may reconnect with the ADC data server 130. The reconnect time out period is configurable by users of the ADC device platform 100. After the reconnect time out period, the ADC data server 130 discards all data resources for the client. The ADC data server 130 uses a "no activity time out" to control client communications when the ADC data server 130 "pings" clients for which there has been no recent activity. For clients that fail to respond, the ADC data server 130 enters a communication "retry" mode similar to the connection error mode above.

The ADC device platform 100 maintains an ADC device handler 239–240 and an ADC protocol handler (in the protocol handler collection 232) for each ADC device, according to an embodiment of the invention. The ADC protocol handlers format messages for device-unique functions while the ADC device handlers format messages for device-common functions. The ADC device handler and ADC protocol handler pair hide device-specific protocols from the ADC clients, simplifying the addition of ADC devices to the ADC device platform 100. The ADC protocol handler collection 232 contains the ADC protocol handlers.

The ADC device handlers, such as the ADC device handler 239, accept commands from the ADC data server 130, translate them into commands for their respective ADC device, and send them to the ADC device using a serial channelor any other means for communicating with the ADC device, such as Short Haul RF and parallel channel. The ADC data server 130 utilizes the ADC device handlers 239, 240 for communicating instructions to the ADC devices 117, 118, respectively. Each supported ADC device, such as the ADC device 118, has a corresponding ADC device handler, such as the ADC device handler 240 for the ADC device 118. Accordingly, if the ADC device platform 100 includes more than two ADC devices, then the computing system 120 will include more than two ADC device handlers. The ADC device handlers hide the specific access requirements for a respective ADC device from the ADC clients, such as the local application 111 and the remote application 109. The ADC device handlers are COM objects that provide a transport layer for sending data formatted by the corresponding ADC protocol handler in the ADC protocol handler collection 232 to the ADC device, according to an embodiment of the invention. COM objects, or "Component Object Model" objects, are software components that may be assembled into programs or add functionality to existing programs. COM objects may also be easily removed from programs. Of course, the invention does not require the use of COM objects. Dynamic Link Libraries ("DLLs") may also be used, as well as a number of other appropriate technologies.

The ADC protocol handlers in the ADC protocol handler collection 232 provide APIs that allow applications to retrieve ADC data and control ADC devices, such as the ADC devices 117, 118. Each ADC protocol handler in the ADC protocol handler collection 232 is a COM object that supports an ADC device-specific interface to guarantee access to the interface for the ADC data server 130, according to an embodiment of the invention. The ADC device-specific interface operations include opening a client communications channel to a specific ADC device, such as the ADC device 117. For ADC devices that support client handles, the ADC device-specific interface issues a device request that causes the ADC device to return a client handle. A client handle is a numeric value used by the device to identify specific clients. A client handle is assigned to an application when the application first requests a communications channel with the device. A client is a single instance of an application that communicates with the device. For ADC devices that do not support handles, the corresponding ADC device handler itself may generate a handle, according to some embodiments of the invention.

To receive responses from an ADC device, the ADC data server 130 calls the appropriate ADC device handler. Responses provided by an ADC device handler from its corresponding ADC device may include additional information along with the response data to help match the response data to the request that generated the response data or to a client who should receive the data. For example, a read request may return a sequence number, a client handle, a data class specification, and a data set. The sequence number associates a particular read request with a specific response, e.g., the request includes a sequence number. The ADC device handler does not guarantee that the sequence number will be returned. For example, unsolicited responses produced by an ADC device may not have a sequence number, and some ADC devices do not support sequence numbers. The client handle associates input from an ADC device with a specific client. If the ADC device (or the ADC device handler) supports client handles, a client's read request will return the appropriate client handle. The data class specification indicates the data classes to which the response data belongs. The ADC data server 130 may store the data class specification along with the data for retrieval by the appropriate client(s).

When a data read returns a client device handle (and a zero for the sequence number), the ADC data server 130 routes the data to the client having the same client device handle. A client device handle of zero indicates that there is no handle for the response data. If both the sequence number and client device handle are non-zero, the sequence number takes precedence.

When the ADC device handler returns a sequence number of zero and a client device handle of zero, the ADC data server 130 performs grid processing to determine which client(s) should receive the data, according to an embodiment of the invention. First, the ADC data server 130 performs non-device specific grid processing to match one or more data masks with the data received from the ADC device. The ADC data server 130 next calls the appropriate ADC device handler's "match grid" function to perform device-specific grid processing. If both grids match, then the response is routed to the identified client.

The ADC data grid operates as a data filter criteria. A client receives only the data that meets its criteria specified, shown and described below with respect to FIG. 8. The ADC data server 130 supports data filtering so that the data sent to ADC clients matches their grid criteria. The ADC data server 130 supports non-device specific grid criteria, and the ADC device handlers support device-specific grid criteria. The ADC data grid may be changed dynamically. The ADC data grid may comprise three components, according to an embodiment of the invention. The three components are one or more data classes, a device-independent grid data mask, and a device-dependent grid mask. A device-dependent mask is specific to the device type. For example, a device-dependent mask may exist for Code 39, which is a type of data that may be produced from an ADC device known as a bar code scanner. Non-device specific grid criteria may be represented in a data mask, having a data pattern such as "###-##-####" where "#" represents a numeric value and "-" represents a dash literal, according to an embodiment of the invention. A literal is a value used in a program that is expressed as itself rather than as a variable's value or the result of an expression. Other non-device specific grid criteria include a data value range (for example, the data values from 23 to 192 may be specified); a number of data elements, a range for the number of data elements (for example, bar-code labels containing from 6 to 9 characters may be specified) and a data class specification. The ADC data grid is considered matched when all grid specifications are true. To perform grid matching, the ADC data server 130 first attempts to match one of the data classes and then tries to match the device-dependent grid and the device-independent grid, according to an embodiment of the invention. If all three conditions are satisfied, then the data response will be returned to the client. In other words, the grid specifications are logically "ANDed" to determine whether the grid matches.

Of course, each client application will typically complete the following sequence in order to read data: perform an Open(Device) operation, perform a series tasks such as Read(Data_Grid) and device control, concluding with a Close( ) task when the client does not wish to access the ADC device anymore, according to an embodiment of the invention. The open/close operations are typically performed only once, while other device accesses may be performed multiple times by the client application.

The ADC data grid contains a data class specification that identifies the data classes accepted for a client and the data classes specifically disallowed. A data class is a device-dependent classification of data responses from an ADC device. The ADC device handler identifies an ADC device response with one or more data classes. Data classes can identify responses that come from device configuration requests, responses that come from user-entered data, and responses that come from ADC data server requests. The ADC protocol handler may change the data class specification. When the protocol handler sends a read request to an ADC device, the ADC protocol handler specifies one or more data classes requested to be read. The data class specification identifies the data classes that may be queued for the client and those that are specifically disallowed.

The ADC data server 130 supports read ahead and non-read ahead clients. For a read ahead client, the ADC data server 130 queues data until the client is ready to read it. Read ahead de-couples ADC device performance from an ADC client's communications system performance. For a non-read ahead client, the ADC data server 130 does not post a data read to an ADC device until the client posts a read to the ADC data server 130. However, if an ADC device sends data without a read posted, the ADC data server 130 accepts the data, buffers it, and returns it to the client on the next read.

The ADC data server 130 may further support read ahead clients by automatically posting a read to the ADC device on the client's behalf when the ADC data server 130 receives data from the ADC device. When its data queue is full, the ADC data server 130 notifies the appropriate ADC device handler that no more data can be read. The next read by the client returns the data, and the ADC data server 130 notifies the appropriate ADC device handler that data can again be read. The ADC data server 130 may support non-read ahead clients by canceling all outstanding read ahead requests and not issuing another read command until the client issues a read. This allows the non-read ahead clients to pace the device operator in entering data. Only one non-read ahead client will be allowed at a time for a given ADC device since the non-read ahead client paces the performance of the ADC device, according to a preferred embodiment of the invention.

The ADC data server 130 also supports synchronous and asynchronous requests. For a synchronous request, the ADC data server 130 blocks the call until the request is complete or until the timeout expires. When a synchronous request is outstanding, the ADC data server 130 blocks all other requests except for a cancel request. For asynchronous requests, the ADC data server 130 returns the call immediately with or without data. Whenever data is received for asynchronous local clients, the ADC data server 130 may signal an ADC client-supplied event. For asynchronous clients, another mechanism may be utilized, according to an embodiment of the invention.

The invention allows a client application to indicate the types of data it should receive and provides a mechanism for routing ADC data to its appropriate destination. The data types registered by various application programs are stored in an ADC data grid that filters data received from each ADC device. By routing data based upon its type, the invention allows application programs to specialize their data requests and process all data of a given type, without regard for the ADC device from which the data has been retrieved.

When an ADC device platform manufacturer, a user, or an ADC device developer adds a new ADC device to an ADC device platform, then the user's application programs may receive appropriately channeled data from the new ADC device by merely providing an appropriate filter to the ADC data grid once the new device has been properly installed. Of course, the client application will also have to complete steps such as opening the device, performing a data read, and closing the device. Thus, the ADC data grid provides a streamlined means for adding the new ADC device. Moreover, by allowing application programs to register their data requests with the ADC data grid, the invention provides a capability for adding new data recipients and permits reconfiguration of the ADC device platform for service in new data collection environments.

The invention also provides a data transfer mechanism that enables simultaneous transmission of data to client applications over a number of different output mechanisms. An ADC device platform equipped with the data transfer mechanism allows more than one client application to receive and process data from one or more ADC devices. Depending on the type of output mechanism requested by the client applications, the data transmitted over the multiple channels on an ADC device at any instance may be the same set of ADC data in route to different client applications. The data transmitted from the ADC device platform at any given instance may also be a set of data from one ADC device to one client application, via a particular output mechanism, and another set of data from another ADC device to another application, via another output mechanism. In some embodiments, the data transfer mechanism obviates the need to buffer data for transmission to client applications because all client applications receive the data at the same time.

Figure 3:
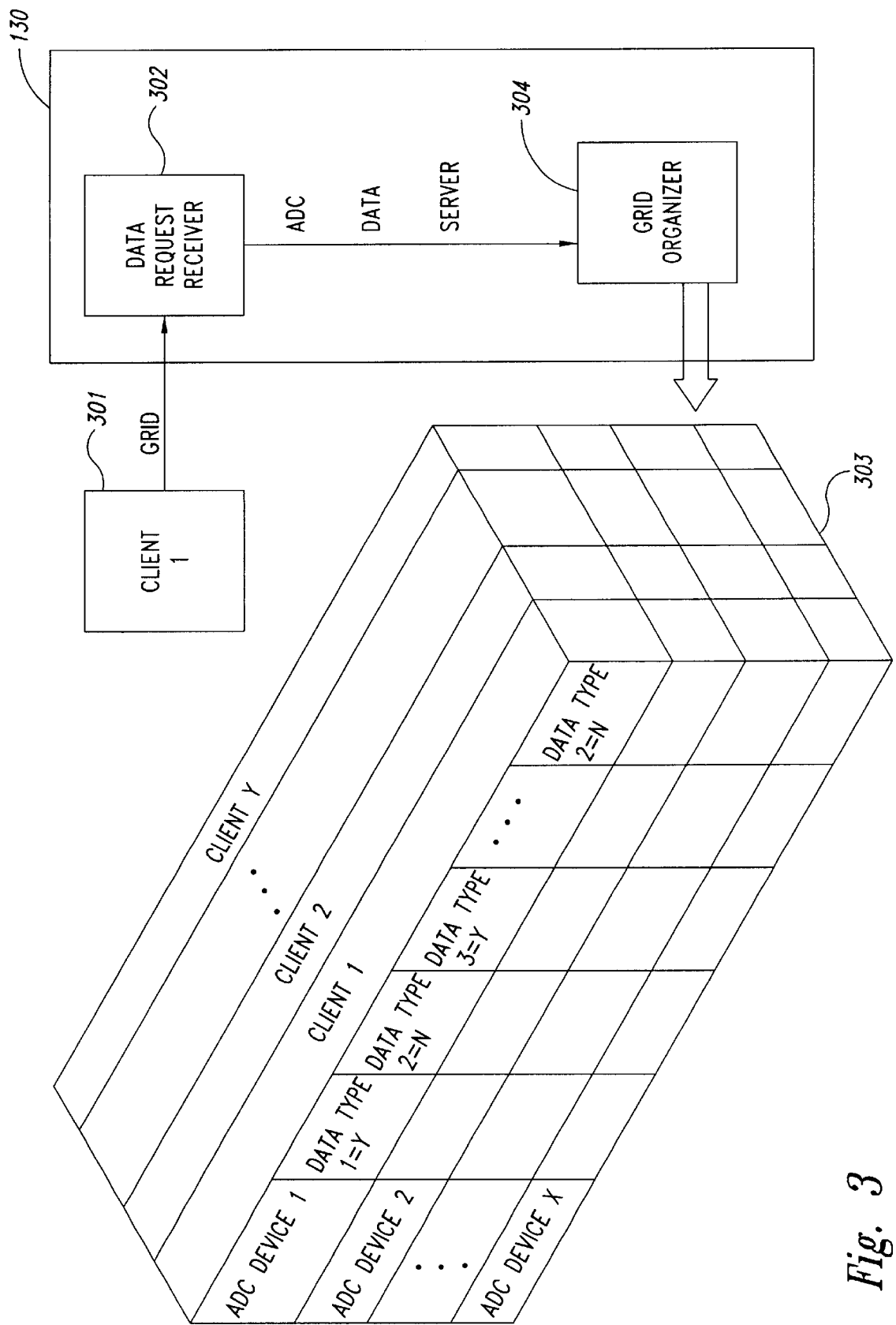
FIG. 3 is a block diagram illustrating the process by which a client application registers its data requests for a given ADC device in an ADC data grid.

FIG. 3 is a block diagram illustrating the process by which a client application registers its data requests for a given ADC device in an ADC data grid. A client 301 sends a data request to the ADC data server 130. The client 301 may be a local application, such as the local application 111 or the client 301 may be a remote application, such as the remote application 109. The ADC data server 130 routes the data request to a data request receiver 302. The data request receiver 302 analyzes the data request to determine that it satisfies the formal requirements for such requests. If the data request satisfies the formal requirements, the data request receiver 302 routes the data request along with an identity for the client 301 to a grid organizer 304.

The grid organizer 304 then adds the clients' data request to an ADC data grid 303. The ADC data grid 303 is represented as a unified collection of data requests; however, the ADC grid 303 may actually be stored in disparate locations throughout the ADC device platform 100. Regardless of how or where its data routing instructions are stored, the ADC data grid 303 allows each client application to store instructions regarding the data types that it wishes to receive for each of the ADC devices associated with the ADC device platform 100.

Figure 4:
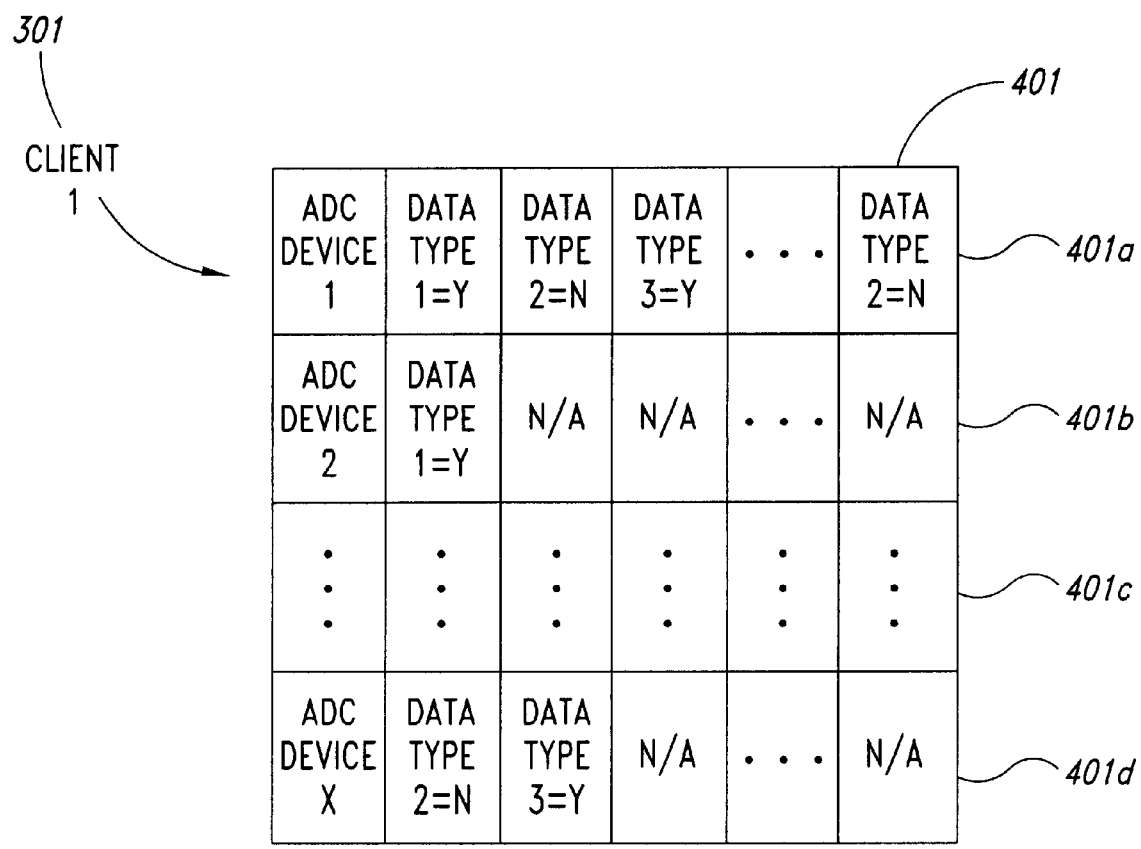
FIG. 4 represents a portion of the ADC grid 303 that contains the ADC data requests registered by the client 301.

FIG. 4 represents a portion of the ADC grid 303 that contains the ADC data requests registered by the client 301. A grid array 401 retains the data requests submitted by the client 301 for the ADC devices associated with the ADC device platform 100 (e.g., ADC device 1-ADC device X). As indicated by the ellipsis between the ADC device 2 and the ADC device X, the ADC array 401 may contain more than three ADC devices. The rows of the ADC data grid 401 provide the information regarding how the ADC data server 130 will process various data types provided by a specific ADC device that could be routed to the client 301. ADC device 1 through ADC device X may represent any ADC device capable of producing data, such as a bar code reader, RF tag reader or SmartCard reader.

In the ADC data array 401, the client 301 has requested to receive ADC data type 1 and ADC data type 3 when such data types are retrieved by the ADC device 1. For example, data types 1 and 3 can be different bar code symbologies, e.g., UPC and Code 1. As indicated by the ellipsis between the data type 3 and the data type Z, the ADC device 1 may process an essentially unlimited number of data types. The client 301 may request receipt of different types of data from different ADC devices and does not necessarily need to have the same instruction for each data type. Data type 1 to data type Z may represent any of the various types of data that may be retrieved by an ADC device, such as Code 39. Different types of ADC devices may produce different types of data, and all ADC devices may not necessarily be capable of producing the data types available from another type of ADC device.

Figure 5A:
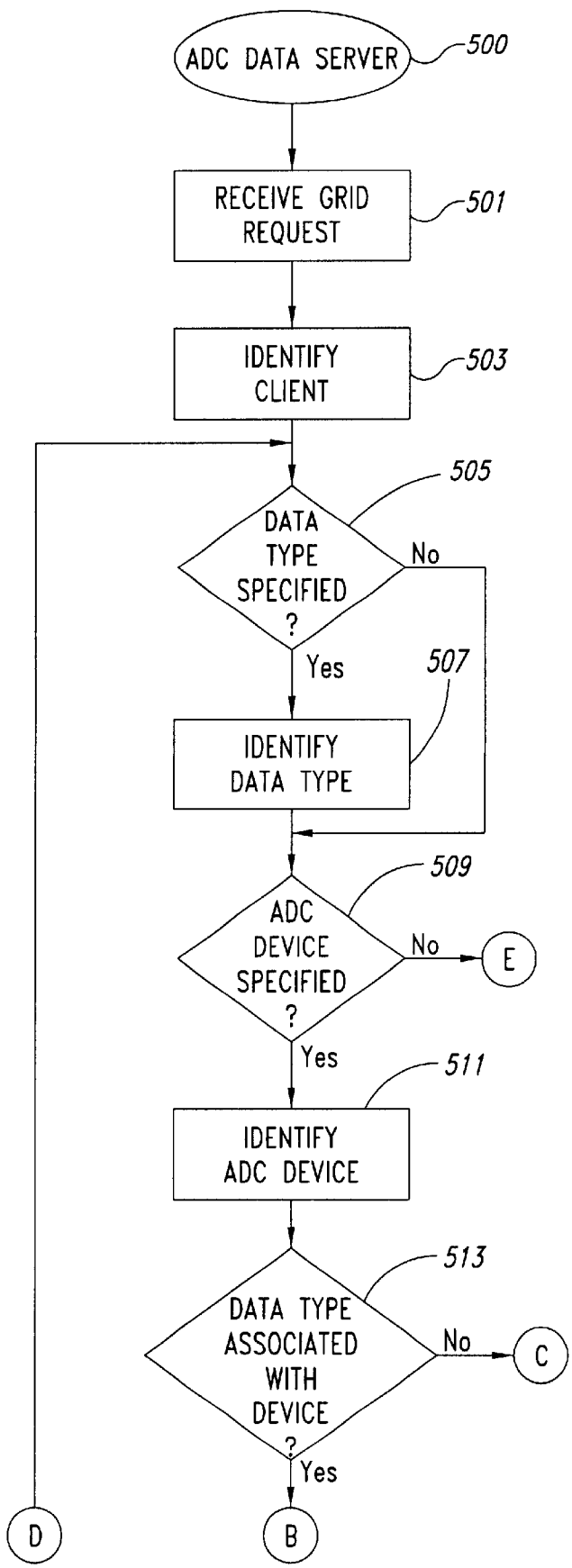
FIGS. 5A–5B are flowcharts illustrating the operations of the ADC data server 130 with regard to processing data type registration requests from client applications associated with the ADC device platform 100.
Figure 5B:
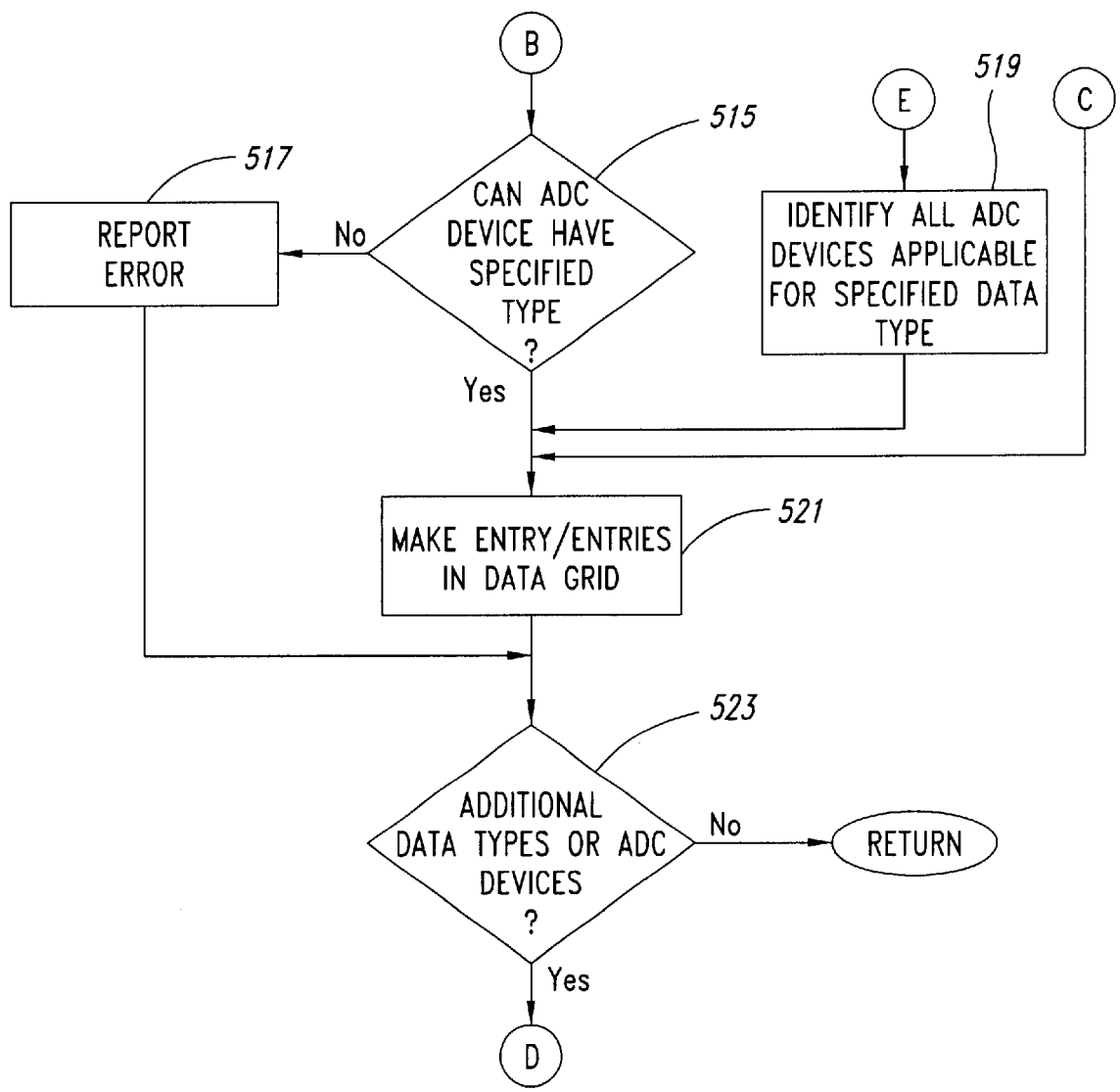

FIGS. 5A–5B are flowcharts showing the operations of the ADC data server 130 with regard to processing data type registration requests from client applications associated with the ADC device platform 100.

The ADC device server 130 receives a grid request (step 501). A client application sends a grid request to the ADC data server 130 to provide directions regarding the processing of ADC data. The ADC data server 130 identifies the client (e.g., the remote application 109) associated with the received grid request (step 503). The ADC data server 130 determines whether the grid request specifies a particular data type (step 505). If the received grid request specifies a data type (step 505), then the ADC data server 130 identifies the data type specified (step 507). Otherwise, the ADC data server 130 continues processing the received data registration request.

The ADC data server 130 next determines whether an ADC device has been specified in the grid request (step 509). If an ADC device has been specified, then the ADC data server 130 identifies the specified ADC device (step 511). If no ADC device has been specified (step 509), then the ADC data server 130 identifies all ADC devices capable of producing the specified data type (step 519).

If the ADC data server 130 has identified the requested ADC device (step 511), then the ADC data server 130 determines whether the previously specified data type (if any) is associated with the identified ADC device in the grid request (step 513). If the specified data type is associated with the identified ADC device in the grid request (step 513), then the ADC data server 130 determines whether the identified ADC device may process the requested data type (step 515). If the identified ADC device does process the requested data type (step 515), then the ADC data server 130 makes the appropriate entry or entries into the ADC data grid (step 521). If the ADC data server 130 determines that the identified ADC device may not process the requested data type (step 515), then the ADC data server 130 generates a report error (step 517).

Once the ADC data server 130 has identified all of the data routing requests in the received data registration request, then the ADC data server 130 makes the appropriate entry or entries into the ADC data grid 303 (step 521). The ADC data server 130 next determines whether additional data types or additional ADC devices have been specified in the received data grid request step 523). If additional data types or ADC devices have been specified in the data registration request (step 523), then the ADC data server 130 returns to its analysis beginning with step 505. If additional data types or ADC devices have not been specified (step 523), then the ADC data server 130 terminates the data type registration function.

Figure 6:
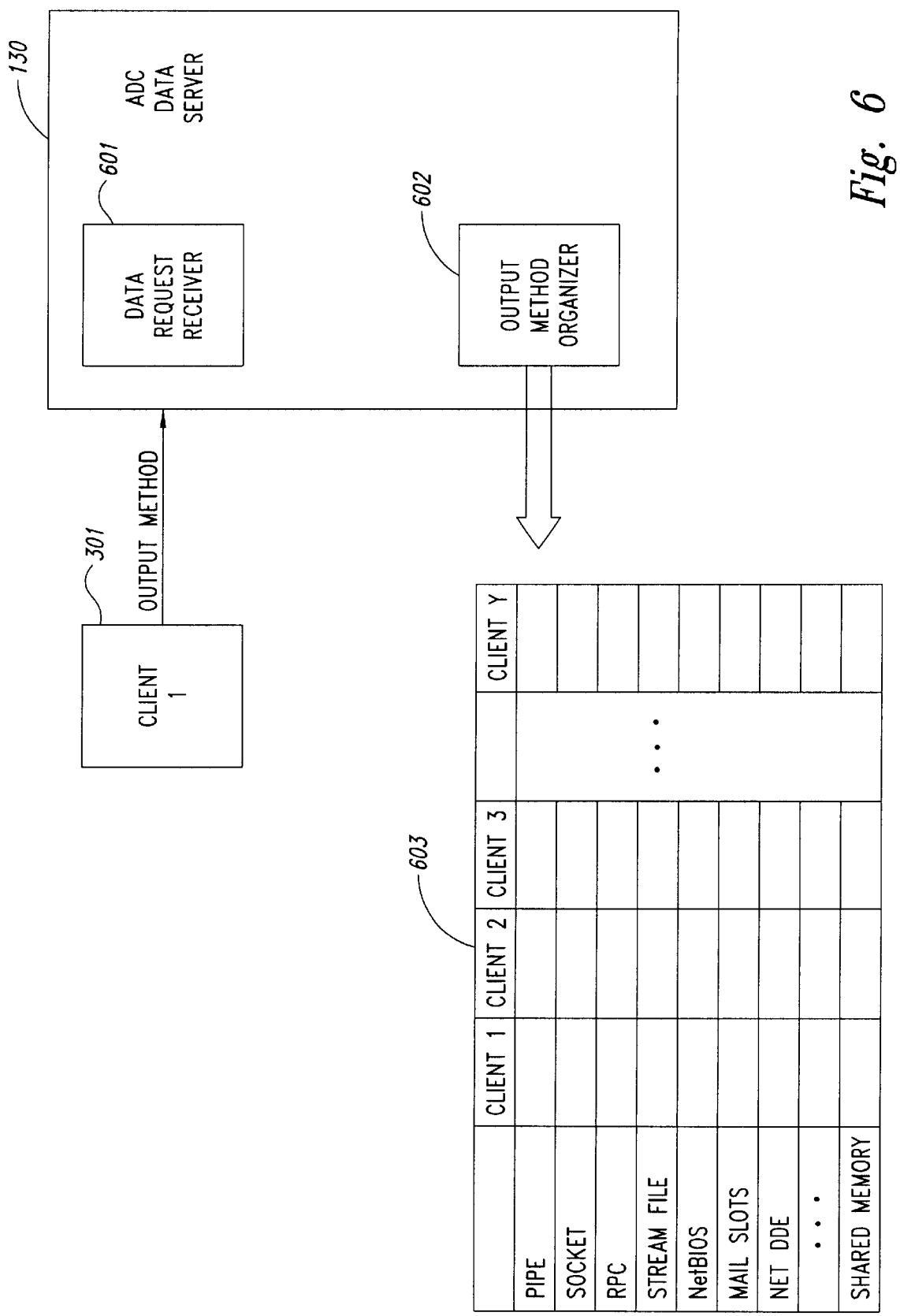
FIG. 6 is a block diagram illustrating the process by which a client application specifies an output mechanism for ADC data.

FIG. 6 is a block diagram illustrating the process by which a client application specifies an output mechanism for ADC data. The client 301 sends an output mechanism request to the ADC data server 130. A data request receiver 601 in the ADC data server 130 receives the output mechanism request and determines the identity of the client 301. The data request receiver 601 may also receive output mechanism requests from a user interface associated with the ADC device platform 100 for one or more client applications. The data request receiver 601 determines whether the output mechanism request satisfies the formal requirements for such requests and generates an error message if the formal requirements are not satisfied. Otherwise, the data request receiver 601 forwards the output mechanism request to an output mechanism organizer 602. The output mechanism organizer 602 processes the output mechanism request and stores the processed request for the client 301 in an output mechanism grid 603.

The output mechanism grid 603 lists all the possible output mechanisms available on the ADC device platform 100 in an array along with all of the clients associated with the ADC device platform 100. As shown in the output mechanism grid 603, an unlimited number of clients may be specified as well as an unlimited number of output mechanisms. The output mechanisms listed in the output mechanism grid 603 include pipes, sockets, RPC, stream files, NetBIOS, mail slots, NetDDE, and shared memory. These output mechanisms are all well known in the art. Of course, other embodiments of the output mechanism grid 603 may include more or fewer output mechanisms than shown in this embodiment. Moreover, while the output mechanism grid 603 is depicted as a unified structure, the actual storage of such information may occur in more widely dispersed locations throughout the ADC device platform 100.

Once the client 301 has specified an output mechanism, then the ADC data server 130 will output data received for the client 301 in accordance with the specified output mechanism. In some embodiments, the client 301 may specify a particular output mechanism for ADC data received from a particular ADC device, specify a particular output mechanism for a particular data type or both. Thus, the client 301 may specify more than one output mechanism.

Figure 7:
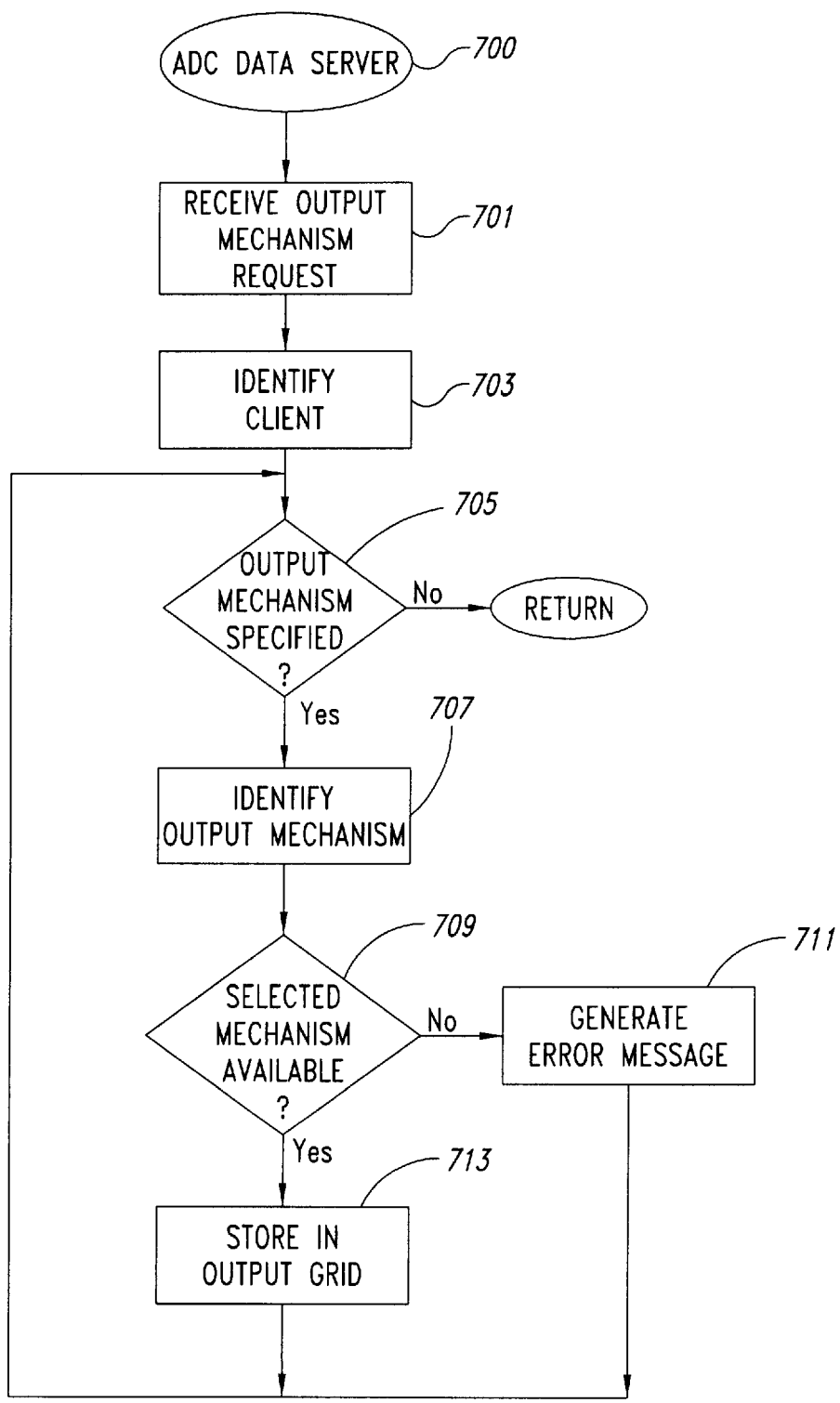
FIG. 7 is a flowchart illustrating the operations of the ADC data server 130 with regard to the processing of output mechanism instructions from a client application such as the client 301.

FIG. 7 is a flowchart illustrating the operations of the ADC data server 130 with regard to the processing of output mechanism instructions from a client application such as the client 301.

The ADC data server 130 receives the output method request from the client 301 (step 701). The ADC data server 130 identifies the client 301 sending the output method request (step 703). The ADC data server 130 then determines whether an output mechanism is specified in the output mechanism request (step 703). If no output mechanism has been specified (step 705), then the ADC data server 130 terminates its processing of the output mechanism request and generates an error message. If an output mechanism has been specified (step 705), then the ADC data server 130 identifies the particular output mechanism specified (step 707).

The ADC data server 130 then determines whether the selected output mechanism is available on the ADC device platform 100 (step 709). If the selected output mechanism is available on the ADC device platform 100, then the ADC data server 130 stores the output mechanism request for the identified client in the output grid (step 713). If the selected output mechanism is not available on the ADC device platform 100, then the ADC data server 130 generates an error message that is sent to the client 301 sending the output mechanism request (step 711).

The output mechanism request may contain more than one requested output mechanism. For example, the client 301 may wish to provide an alternate output mechanism. Accordingly, the ADC data server 130 then determines whether additional output mechanisms have been specified (step 705). The ADC data server 130 then continues processing the output mechanism request until the entire request has been completely processed.

Figure 8:
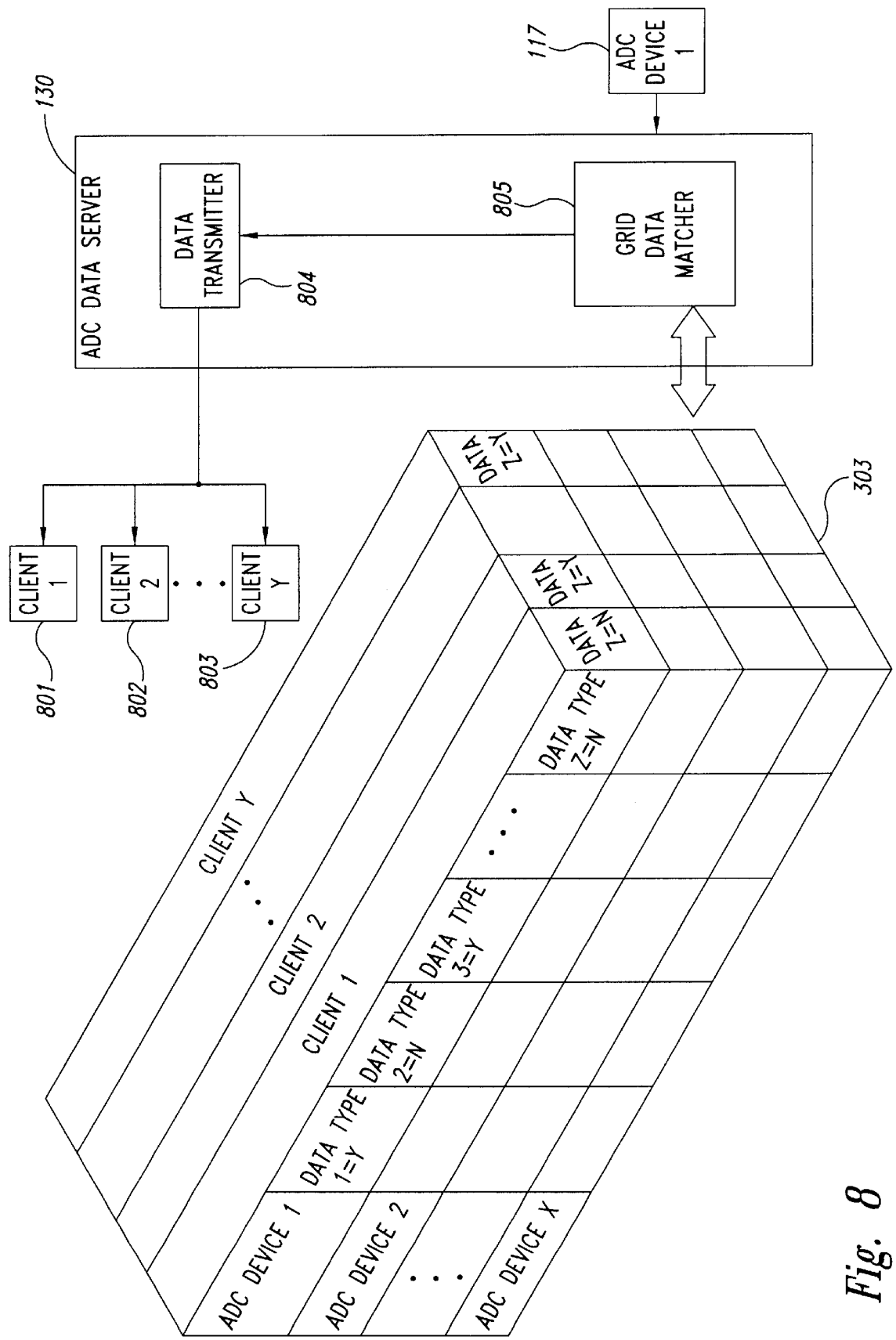
FIG. 8 illustrates one embodiment of the ADC device platform 100 that intelligently routes data to client applications.

FIG. 8 illustrates an embodiment of the ADC device platform 100 that intelligently routes data to client applications. The ADC data server 130 receives data from the ADC device 117 and may transmit received data to clients 801–803. The ellipsis between the client 802 and the client 803 indicates that the ADC data server 130 may transmit data to more than three clients. The clients receiving data may include both local and remote applications, such as the local application 111 and the remote application 107 shown in FIG. 7. The ADC data server 130 may also transmit data to fewer than three clients.

The ADC data server 130 includes a data transmitter 804 and a grid data matcher 805. When the ADC device 117 transmits data to the ADC data server 130, the grid data matcher 805 analyzes the ADC data received from the ADC device 117 and then references the ADC data grid 303. The ADC data grid 303 comprises a collection of client data requests and ADC devices. For example, each client may specify the types of data that it wishes to receive from a particular ADC device. The grid data matcher 805 determines the type of ADC data sent by the ADC device 117, for example, and then references the ADC data grid 303 to determine which clients, if any, have requested data of the type received from the ADC device 117. For example, the client 803 may have requested that it receive two different types of data transmitted by the ADC device 117. Similarly, other clients may have also specified various data types with regard to data provided by the ADC device 117. The grid data matcher 805 determines how many clients will receive data of the received data type from the ADC device 117.

The grid data matcher 805 then informs the data transmitter 804 which, if any, of the clients 801–803 will receive the ADC data transmitted by the ADC device 117. In some circumstances, no client may have registered to receive the type of data received from a particular ADC device. In such cases, the received ADC data will not be transmitted to any of the clients 801–803 but may be buffered by the ADC data server 130 for a configurable time period or until a client registers for receipt of data having such characteristics.

The ADC data grid 303 may be stored in memory of the computing system 120 as a unified grid or may be stored in disparate elements throughout the computing system 120. Similarly, the computing elements that perform the tasks of the grid data matcher 805 and the data transmitter 804 may constitute unique computing elements within the ADC data server 130 or may be comprised of separate computing elements that cooperatively perform the tasks discussed.

Figure 9:
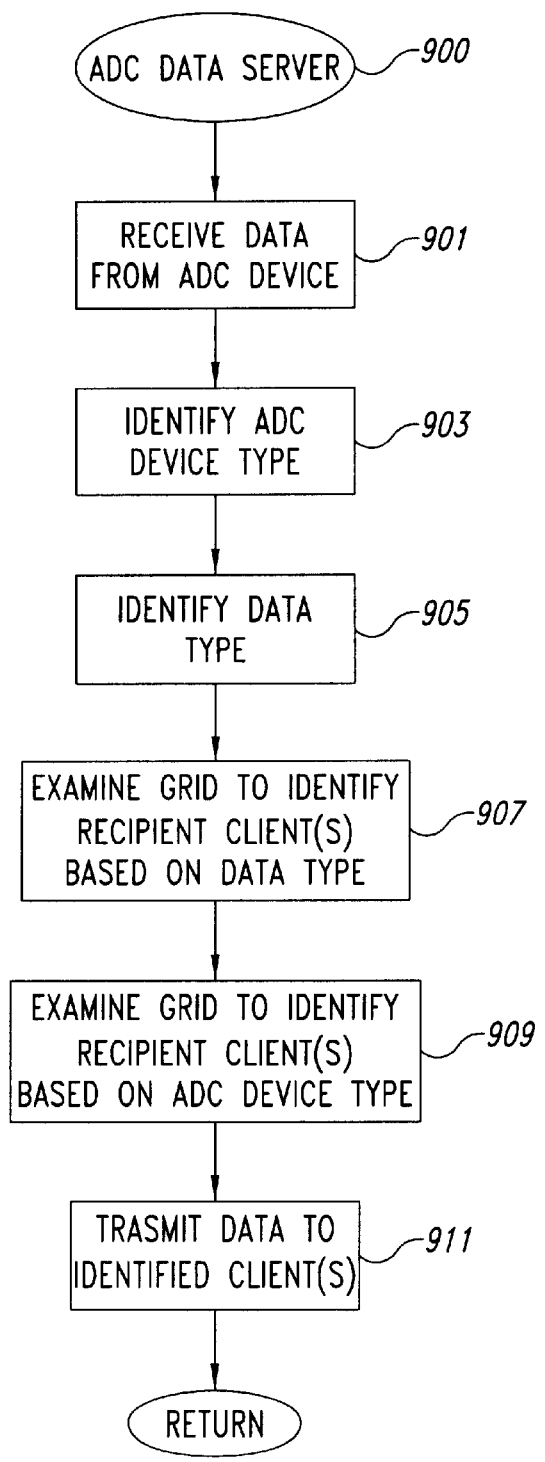
FIG. 9 is a flowchart showing the intelligent data routing operations performed by the ADC data server 130.

FIG. 9 is a flowchart showing the intelligent data routing operations performed by the ADC data server 130. The ADC data server 130 receives ADC data from an ADC device, such as the ADC device 117 (step 901).

The ADC data server 130 then identifies the ADC device type (step 903). The ADC data server 130 next identifies the data type of the ADC data received from the ADC device (step 905). As discussed with regard to FIG. 8, the ADC data server 130 may include elements such as the grid data matcher 805 that performs tasks such as those in steps 901 and 903.

The ADC data server 130 examines the ADC data grid 303 to identify recipient client(s) (e.g., the remote application 109) for the received ADC data based upon data characteristics and the ADC device (step 907). As previously discussed, the ADC data grid 303 may be interrogated by ADC data server 130 functionality such as the grid data matcher 805. The ADC data server 130 thus examines the ADC data grid 303 to identify recipient clients for the received data based upon the ADC device type (step 909). The ADC data server 130 thus analyzes a matrix comprised of data type and ADC device type to determine the recipient(s) for the received ADC data. The ADC data server 130 may alternatively perform step 909 prior to step 907.

The ADC data server 130 then transmits the ADC data to the identified clients (step 911). As previously discussed, the ADC data server 130 may transmit ADC data to one or more than one client. Moreover, if examination of the ADC data grid 303 reveals that no client has requested receipt of the received ADC data type from the ADC device, then the ADC data server 130 will not transmit the received ADC data.

Figure 10:
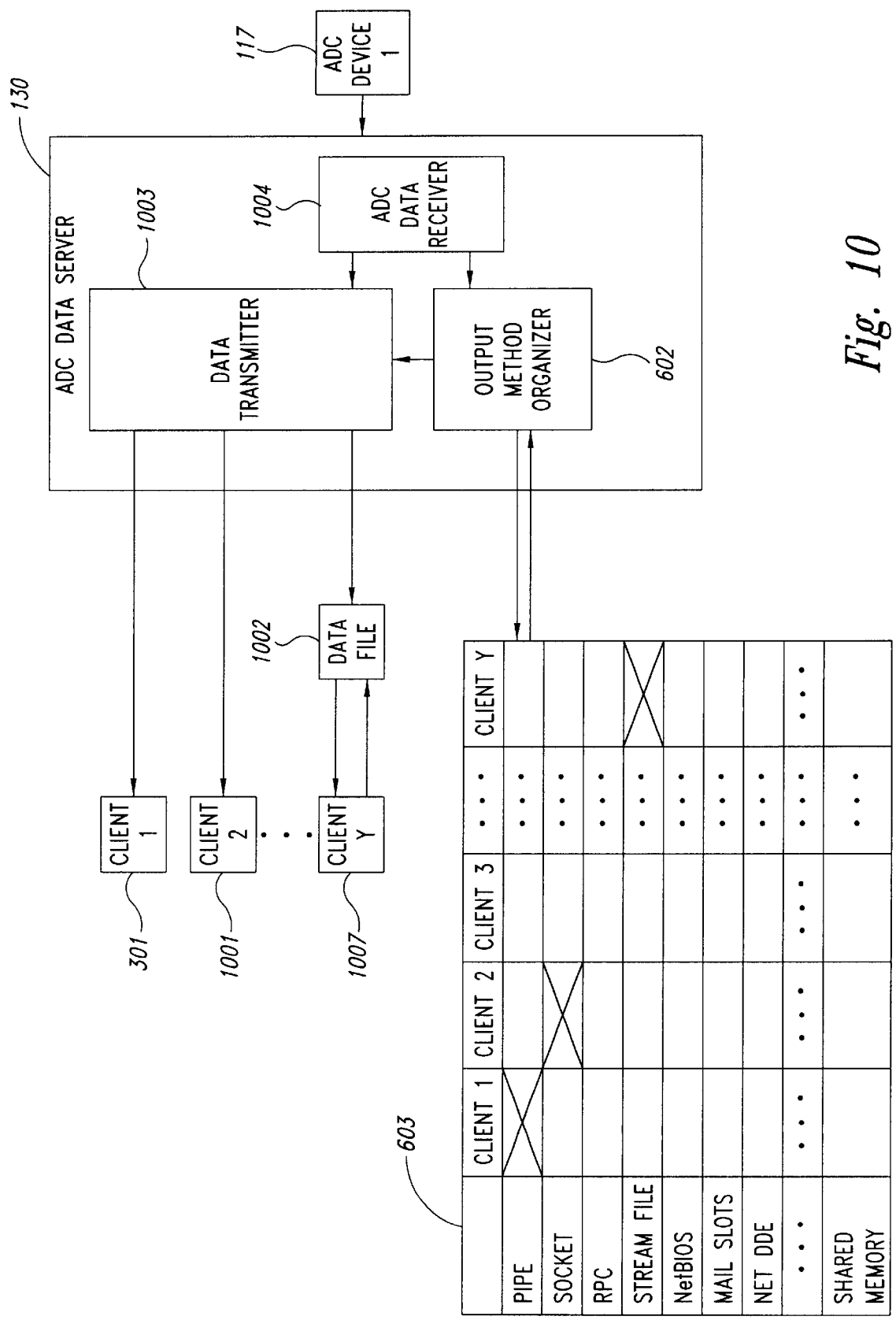
FIG. 10 provides a block diagram illustrating the processing of ADC data using the output mechanism grid 603 shown in FIG. 6.

FIG. 10 provides a block diagram illustrating the processing of ADC data using the output mechanism grid 603 shown in FIG. 6. The ADC device 117 sends ADC data to an ADC data receiver 1004 in the ADC data server 130. The ADC data receiver 1004 then transmits the received ADC data to an ADC data transmitter 1003 and the output mechanism organizer 602. The output mechanism organizer 602 analyses the received ADC data to determine which client(s) will be receiving the ADC data. Once the output mechanism organizer 602 has determined which client(s) will receive the ADC data, then the output mechanism organizer 602 examines the output mechanism grid 603 to determine the output mechanism specified by the clients that will receive the ADC data. As indicated by the ellipsis between the clients, the output mechanism grid 603 may contain an unlimited number of clients. As indicated by the ellipsis in the list of possible output mechanisms, the output mechanism grid 603 may process an unlimited number of output mechanisms. The output mechanism organizer 602 then transmits the identity of the selected output mechanism to the data transmitter 1003.

The data transmitter 1003 transmits the ADC data to the clients selected for receiving the ADC data using the selected output mechanism. In the embodiment shown in FIG. 10, three clients, the client 301, a client 1001 and a client 1007 may receive the ADC data sent by the ADC device 117. In the case of the client 1007, the data in the output mechanism grid 603 indicates that the selected output mechanism is outputting the ADC data to a data file 1002. Accordingly, the data transmitter 1003 outputs the ADC data destined for the client 1007 to the data file 1002. The client 1007 may then read the data file 1002 to receive the ADC data.

Figure 11:
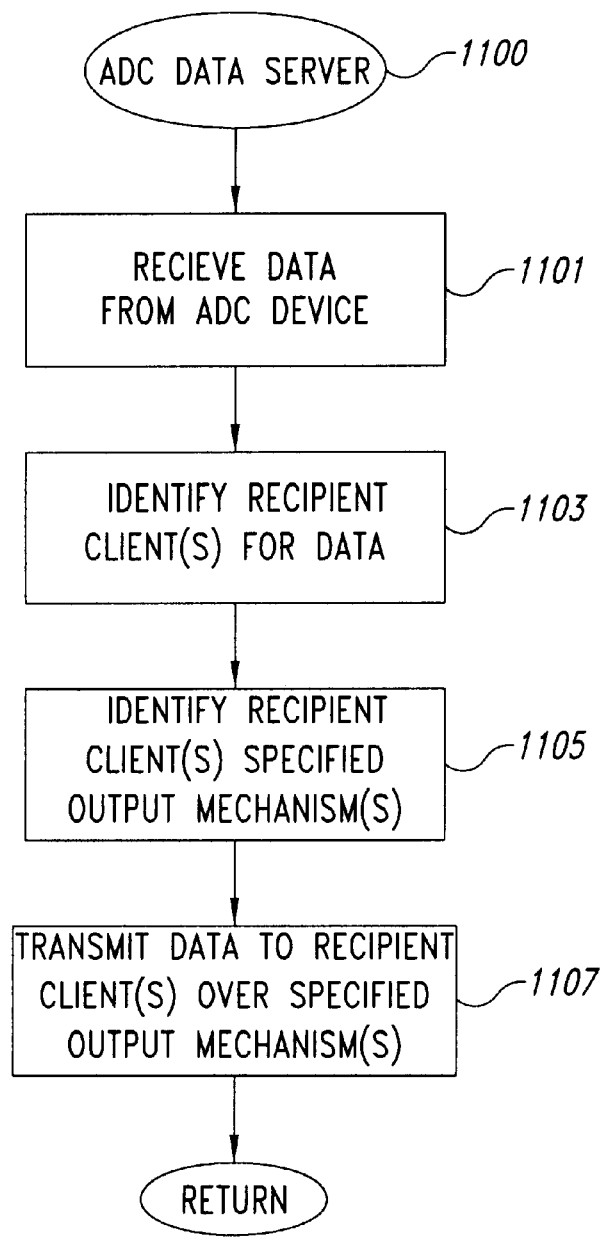
FIG. 11 is a flowchart illustrating the procedures followed by the ADC data server 130 for transmitting ADC data to client applications associated with the ADC device platform 100.

FIG. 11 is a flowchart illustrating the procedures followed by the ADC data server 130 for transmitting ADC data to client applications associated with the ADC device platform 100. The ADC data server 130 receives data from an ADC device, such as the ADC device 117 (step 1101). The ADC data server 130 identifies the recipient clients for the received ADC data (step 1103).

The ADC data server 130 identifies the recipient clients' specified output mechanism using an output mechanism grid, such as the output mechanism grid 603 (step 1105). Once the ADC data server 130 has determined the specified output mechanism for the client(s) to receive the ADC data, then the ADC data server 130 transmits the data to the recipient clients over the specified output mechanism (step 1107).

Figure 12:
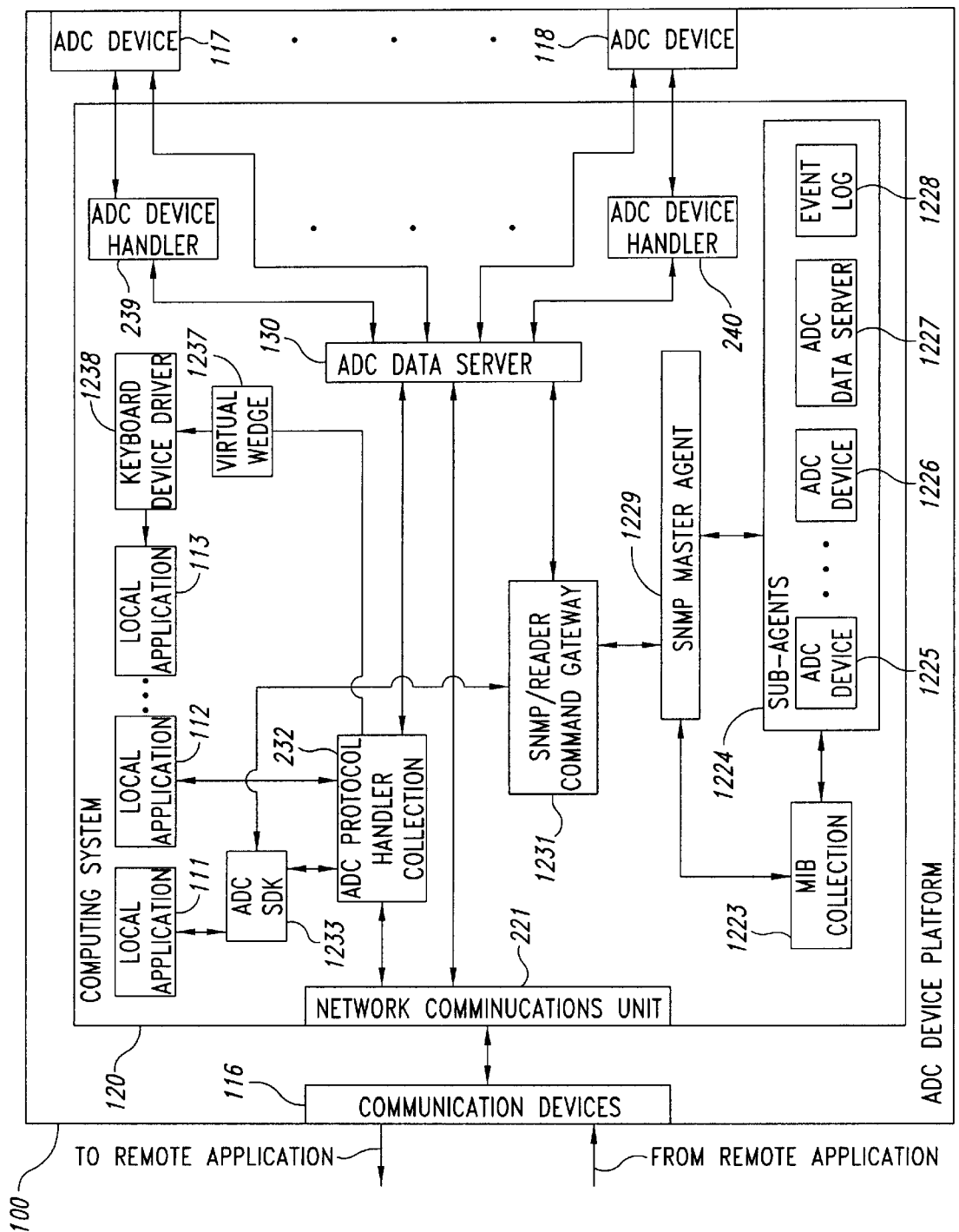
FIG. 12 illustrates an alternate embodiment of the ADC computing system 120.

FIG. 12 illustrates an alternate embodiment of the ADC computing system 120. The ADC computing system 120 further comprises an SNMP/Reader Command Gateway 1231, an SNMP master agent 1229, a management information base ("MIB") collection 1223, an SNMP subagent collection 1224, a virtual wedge 1237, a keyboard device driver 1238, and an ADC software development kit ("SDK") 1233, all described below.

The ADC data server 130 uses shared memory and process synchronization objects to perform inter-process communication ("IPC"). The IPC mechanisms are hidden within the ADC data server's API, and the ADC device handlers. The ADC data server API provides an ADC device-ADC data server interface. The ADC device-ADC data server interface hides the IPC mechanism from the ADC data server process. The ADC device-ADC data server interface initializes and deletes an ADC data server API COM object for an ADC device and opens and closes a logical communications channel with an ADC device, such as the ADC device 117. The ADC data server 130 determines the default channel attributes.

The ADC device-ADC data server interface may request data from the ADC data server 130. This operation produces a "data class mask" that identifies the class of data to be sent to a particular client, as previously discussed with regard to FIG. 2. The data class masks may be device dependent or device independent. The ADC data server 130 only returns data from the mask(s) identified. The ADC device-ADC data server interface sends control data to the ADC device without interpretation by the ADC data server 130. The ADC device-ADC data server interface may also perform a "query attribute" function that returns a specific device attribute or specific client handle attribute. Device attributes include the device's enablement status. Handle attributes include in the device-dependent grid, the device-independent grid, read ahead status, and the data class read specification. The ADC device-ADC data server interface performs alterations of specific ADC device attributes. The ADC device-ADC data server interface includes a "query data" function that returns the number of data items stored for a client and the size of the next data item. The ADC device-ADC data server interface further includes operations such as reading a data class, setting attributes, and matching the ADC data grid. The "match grid" command requests that the ADC device handler determine if the input data matches the input grid. Both the structure and meaning of the data, and the structure and meaning of the grid are device dependent.

The ADC data server process interface includes an open function that opens a single data collection device channel and returns an ADC data server client handle that allows a client to access the ADC device. The open function creates a device client handle for the ADC device. The ADC protocol handler can retrieve a device's client handle. The ADC server process interface also allows the setting of specific ADC device attributes. Using an ADC data server client handle as input and the device attribute to be set, this function may be used for setting ADC device attributes such as enable/disable status; data grid (device independent and device dependent); read ahead/non-read ahead status; device client handle, and data class specification.

The ADC data server process interface also includes a read function that allows an ADC protocol handler to receive ADC data or device responses from an ADC device. The read function takes an ADC data server client handle and a data class mask indicating the classes of data to be retrieved. The structure of the data returned is device dependent. If the data class mask indicates that ADC data will be read, the read function initiates reading ADC data from the ADC device. The ADC data server 130 calls the ADC device handler's read function so that it can notify the ADC device that a client is ready to accept data. The function will wait until data is received or until a timeout arises.

Local applications, such as the local application 111, may utilize the ADC SDK 1233 in the collection of ADC data. The SDK is a dynamic link library ("DLL") that allows ADC client applications to use legacy interfaces in communicating with ADC devices. Local applications may also utilize the ADC protocol handler collection 232, which may contain specialized DLLs for each ADC device configured to operate with the ADC device platform 100. DLLs allow executable routines to be stored separately as files having DLL extensions that are loaded only when needed by a program, such as by the local application 111. A DLL routine consumes no memory until it is used. Because a DLL routine is a separate file, a programmer may make connections or improvements to the routine without effecting the operation of the calling program or any other DLL routine. In addition, a programmer may use the same DLL routine with other programs. The DLL interface optimizes performance and resource overhead. The remote applications, such as the remote application 107, may also utilize the specialized DLLs provided by the ADC protocol handler collection 232.

In one exemplary embodiment, the ADC SDK 1233 supports programming elements such as Visual C/C++, Microsoft Foundation Class ("MFC"), Visual Basic, and Java. The ADC SDK 1233 includes Active X control/Java classes, and ADC device platform legacy DLLs. The ADC device platform 100 legacy DLLs provide legacy interfaces that tie together system elements. Both the Active X control/Java classes and the ADC device platform legacy DLL may operate in connection with value-added reseller ("VAR") applications. For example, the VAR applications may provide data collection and unit management applications. The Active X control/Java classes may communicate with a VAR application using Active X and Java APIs. The ADC device platform DLL communicates with the VAR applications through legacy APIs, such as a DLL interface.

The ADC device platform legacy DLLs use legacy reader commands to communicate with the Reader Command/SNMP gateway 1231. The Reader Command/SNMP gateway 1231 in turn uses legacy management commands or an SNMP interface to communicate with an ADC device platform SNMP that includes the SNMP master agent 1229 and the SNMP subagent collection 1224.

As previously discussed, the invention may also determine whether some form of wedging must be performed on the input data from a given device, based upon an application program's requested data input format stored in the output mechanism grid 603 or the ADC data grid 303. The ADC data server 130 may communicate with the keyboard device driver 1238 through the virtual wedge 1237. The virtual wedge 1237 retrieves ADC data from ADC devices 117, 118 and sends it into the keyboard device driver 1238 so that an ADC reader-unaware application, such as the local application 113, receives the ADC data as if it were keyboard input. An exemplary embodiment of the virtual wedge is described in U.S. Pat. application Ser. No. 09/239,558, "Automatic Data Collection (ADC) Device That Includes A Virtual Wedge That Routes ADC Data To Application Programs," filed on Jan. 29, 1999, which is assigned to a common assignee. The invention may similarly operate in conjunction with a mechanism for performing dynamic wedging of ADC data. An exemplary dynamic wedge is described in U.S. application Ser. No. 09/240,425, entitled "Automatic Data Collection ("ACIC") Device That Dynamically Wedges Data Transmitted To Data Customers," filed on Jan. 29, 1999, and assigned to a common assignee.

The ADC device platform 100 utilizes the Simple Network Management Protocol ("SNMP") for network management. SNMP has recently become a well-favored network management protocol. SNMP utilizes a fetch-store paradigm in which agents and subagents maintain sets of management information such as statistics, status, and configuration values in a MIB, such as the MIBs contained in the MIB collection 1223. The elements of an SNMP network management architecture typically comprise an SNMP manager, a managed system (e.g., the ADC device platform 100), a database of management information (e.g., a MIB), and a network protocol (e.g., TCP/IP). An exemplary SNMP network management architecture with regard to an embodiment of the ADC device platform 100 is further described in a provisional patent application entitled "Automatic Data Collection Device Having A Network Communications Capability," U.S. Provisional Application No. 60/084,272. filed on May 4, 1998, assigned to a common assignee.

The SNMP master agent 1229 controls the SNMP subagents in the SNMP subagent collection 1224. The SNMP subagent collection 1224 comprises an ADC data server SNMP subagent 1227, an event log SNMP subagent 1228, an ADC device SNMP subagent 1225 (for the ADC device 117), and an ADC device SNMP subagent 1226 (for the ADC device 118). The ADC device SNMP subagents 1225, 1226 respectively contain control information for the ADC devices 117, 118. The ADC device 117 and the ADC device 118 may each operate under different protocols and commands. For example, the ADC device platform 100 may be equipped with ADC devices as diverse as bar code readers and SmartCard readers. Since each ADC device typically operates under different protocols, each ADC device typically requires its own SNMP subagent. The SNMP subagent collection 1224 may contain a respective ADC device SNMP subagent for each ADC device in the ADC device platform 100. Thus, the SNMP subagent collection 1224 does not necessarily contain precisely two ADC device SNMP subagents. The event log SNMP subagent 1228 allows the SNMP master agent 1229 to retrieve the event log and set its filter. The event log SNMP subagent 1228 also generates SNMP traps when specific events are received.

The SNMP master agent 1229 performs SNMP packet verification on incoming and outgoing SNMP commands while a respective SNMP subagent (e.g., the ADC device SNMP subagent 1225) in the SNMP subagent collection 1224 performs the actual sending and retrieving of control information to/from a network element (e.g., the ADC device 117). For example, the ADC device SNMP subagents 1225, 1226 respectively translate between the communications protocol of ADC devices 117, 118 and the standardized SNMP protocol using information retrieved from the MIB collection 1223. The SNMP master agent 1229 operates with all SNMP compliant management software, according to an embodiment of the invention. The SNMP architecture provides flexibility to the ADC device platform 100 by allowing the SNMP subagents to be added and removed without effecting the other SNMP subagents or the MIB collection 1223. Adding a new ADC device to the ADC device platform 100 requires only adding a new SNMP subagent and storing relevant information in the MIB collection 1223, regardless of the new ADC device's communication protocol. The SNMP architecture also aids ADC device platform manufacturers and their VARs by simplifying the addition of new ADC devices. The ADC data server 130 communicates with the SNMP subagent collection 1224 through a DLL interface. The ADC device platform SNMP master agent 1229 also communicates with the ADC data server, the network communication unit 221, and the computing system's operating system.

The MIB collection 1223 describes or provides management information for SNMP devices, including the ADC data server 130 and the ADC devices 117, 118. For example, the MIB collection 1223 includes a reader group MIB that provides ADC device configuration, reporting ADC device statistics, and running end device diagnostics. The MIB collection 1223 describes a set of objects (such as the ADC devices 117, 118) to the SNMP subagents and provides information about each object, including its structure, its relationship to other objects, and the operations allowed on the object. The MIB collection 1223 essentially tells the SNMP subagents what pieces of information they may modify or view on the ADC device platform 100. Configuration, control, and statistics data particular to the ADC device platform 100 are also described in the MIB collection 1223. In addition to supporting the ADC device platform, the MIB collection 1223 may include additional MIBs such as: a MIB-II ("RFC 1213"), an Intermec Reader MIB, an Intermec UDP+MIB, a Proxim Open Air Radio MIB, a Scorpion 900 MHz Radio MIB, and a 802.11 MIB ("IEEE P802.11"), and other protocols, especially RF readable tag protocols, according to an embodiment of the invention.

The ADC data server 130 may also communicate with the Reader Command/SNMP Gateway 1231 to provide reader commands for the ADC devices. A Reader command controls ADC devices, such as the ADC device 117, by sending commands for operations, such as turning laser scans on and off, changing reader configuration, and performing system management operations like backup and restore. The Reader Command/SNMP gateway 1231 controls parsing/formatting and routing of reader commands. The Reader Command/SNMP gateway 1231 is a DLL that converts legacy reader commands to SNMP requests, according to an embodiment of the invention. Reader commands can be received from bar code devices, 900 MHz devices, and local or remote clients. The Reader Command/SNMP gateway 1231 parses these commands, translates them to an object identifier ("OID") for an appropriate ADC device and then routes the command through the ADC data server 130.

Using the Reader Command/SNMP gateway 1231, an application (e.g., the remote application 109) may transfer legacy system management commands through the Reader Command/SNMP command gateway 1231 to an ADC device, such as the ADC device 117. If a client (e.g., the remote application 109) requests configuration data in reader command format, then the Reader Command/SNMP gateway 1231 packages the configuration data in the reader command format. This architecture isolates all legacy reader command processing in a single place, simplifying maintenance of the ADC device platform 100.

Figure 13:
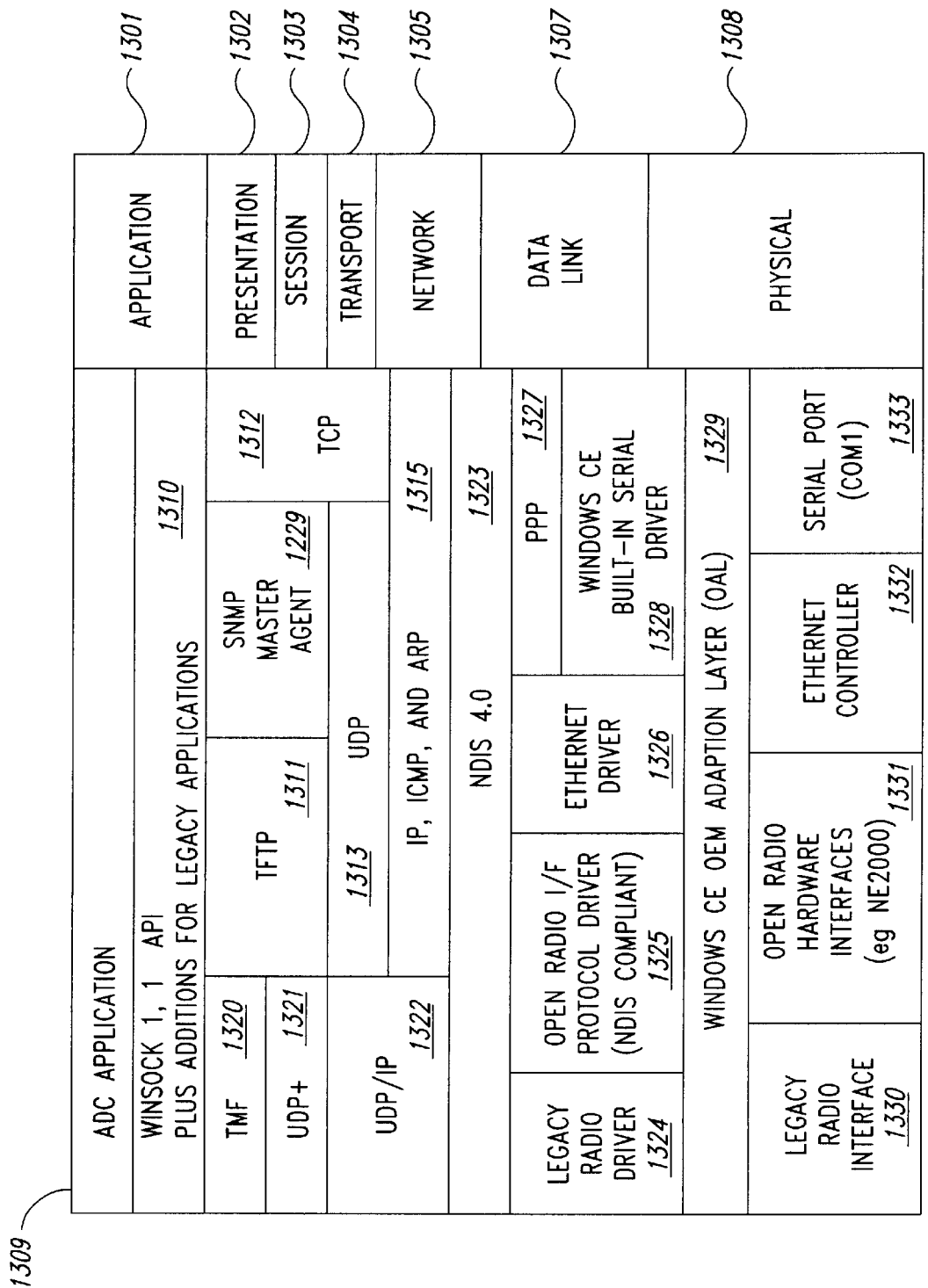
FIG. 13 displays an exemplary ADC device platform's communication protocol stack.

FIG. 13 illustrates an exemplary ADC device platform's communication protocol stack. Data communications systems contain a communications stack for transferring data between computers such as between the ADC device platform 100 and the remote computing system 104. Each computer typically has a communications stack containing a number of layers. For example, the open systems interconnect ("OSI") communications stack defined by the International Standards Organization consists of seven layers. The layers form a sequence from a lowest layer ("or bottom layer") to the highest layer ("or top layer"). The layers divide the processing necessary for communicating between computers into discrete units. The bottom layer in the communications stack typically interacts with the physical medium used for transferring the data, such as coaxial cables. The top layer of the communications stack provides services to application programs, and the middle layers of the communications stack typically are responsible for routing and maintaining a connection. A local computer transfers data to a remote computer when an application program first passes the data to the top layer of the communications stack of the local computer. The top layer then processes the data and sends the data to the next lowest layer in the communications stack.

Thereafter, each layer in turn processes the data until the data reaches the bottom layer, where the data is sent to the remote computer over the transfer medium. The bottom layer of the communications stack of the remote computer receives the data from the transfer medium and passes the data up the communications stack. Each layer performs its specific processing on the data until the data reaches the top layer. The top layer processes the data and sends the data to an application program. A comstack manager typically starts the communication stack and maintains its stack during its lifetime.

In one exemplary embodiment, the communication stack of the ADC device platform 100 utilizes a seven-layered communication protocol, including an application layer 1301, a presentation layer 1302, a session layer 1303, a transport layer 1304, a network layer 1305, a data link layer 1307 and a physical layer 1308. Included in the application layers 1301 are ADC device platform applications 1309 and the Winsock 1.1 API plus additions for legacy applications 1310. The presentation layer 1302 and session layer 1303 may include the Terminal Message Format ("TMF") protocol 1320 and UDP+ protocols 1321, the Trivial File Transfer Protocol ("TFTP") protocol 1311 and the SNMP master agent 1229. The TCP protocol 1312 is included in the application layer 1301, the presentation layer 1302, the session layer 1303, the transport layer 1304, and the network layer 1305. The UDP layer 1313 resides primarily in the transport layer 1304. IP, ICMP, and ARP 1315 reside within the network layer 1305. IP refers to the well-known Internet Protocol. The Internet Control Message Protocol ("ICMP") provides diagnostic functions and can send error packets to hosts regarding message transmission. The Address Resolution Protocol ("ARP") is a low-level protocol utilized by TCP/IP that obtains a physical address when only a logical address is known. UDP/IP 1322 combines UDP with IP and provides communications spanning from the session layer 1303 to the transport layer 1304.

Network Driver Interface Specification ("NDIS") Version 4.0 1323, provides hardware and protocol independence for network drivers utilized by the ADC device platform 100. NDIS, of which version 4.0 may be used, offers a device driver standard that allows for running multiple protocols on the same network adapter.

Legacy radio driver 1324 refers to pre-existing radio driver protocols that may be utilized within the ADC device platform 100. Open Radio Interface 1325 provides radio driver interfaces that are customizable across radio devices. An Ethernet driver 1326 enables Ethernet communications for the ADC device platform 100. The Ethernet provides a local area network ("LAN") that connects computing elements together within the same building or campus. The Ethernet is a physical link and data link protocol, reflecting the two lowest layers of the OSI model. Point-to-Point Protocol ("PPP") 1327 is a data link protocol that provides a well-known method for transmitting IP frames over a circuit. The PPP 1327 may communicate with a WindowsCE built-in serial port driver 1328 that further processes communications into the physical layer 1308.

A WindowsCE Original Equipment Manufacturer ("OEM") Adaptation Layer ("OAL") 1329 represents a service provided by the WindowsCE operating system for the ADC device platform 100 that translates communications into a format required by a given OEM device. Many low-level hardware components on the ADC device platform 100 may be provided by various OEMs, and the WindowsCE operating system provides a method for communicating to the various OEM devices.

Legacy radio interface 1330 provides a match at the physical layer 1308 for the legacy radio driver 1324. Similarly, Open Radio Hardware Interfaces 1331 provides a match at the physical layer 1308 for the Open Radio Interface Protocol Driver 1325. Ethernet controller 1332 matches with the Ethernet Driver 1326, and Serial Port (COMI) 1333 matches with the WindowsCE built-in serial driver 1328.

The invention may operate in conjunction with a virtual wedge, a dynamic wedge, and a system for intelligently routing data. An exemplary virtual wedge is described in U.S. application Ser. No. 09/239,558, entitled "Automatic Data Collection ("ADC") Device That Includes A Virtual Wedge That Routes ADC Data To Application Programs," filed on Jan. 29, 1999, and assigned to a common assignee. An exemplary dynamic wedge is described in U.S. application Ser. No. 09/240,425, entitled "Automatic Data Collection ("ADC") Device That Dynamically Wedges Data Transmitted To Data Customers," filed on Jan. 29, 1999, and assigned to a common assignee. An exemplary system for intelligently routing data to different applications is described in U.S. application Ser. No. 09/240,194, entitled "Automatic Data Collection Device That Intelligently Switches Data Based On Data Type," filed on Jan. 29, 1999, and assigned to a common assignee.

The ADC device platform 102 may be applied in connection with systems and methods for more accurate bar code scanning. Exemplary systems are more clearly described in a patent application entitled "Method for Decoding Bar Code Symbols by Declaring Erasures of Element Widths Based on Soft Decision of Measured Widths," U.S. application Ser. No. 09/007,277, filed on Jan. 14, 1998, and issued as U.S. Pat. No. 6,102,295, on Aug. 15, 2000, and U.S. Pat. Nos. 5,676,473, 5,777,309, 5,539,191, 5,514,858 and 5,553,084, all assigned to a common assignee.

The ADC device platform 100 may also be applied in conjunction with improved scanning devices and procedures. One applicable approach is more clearly described in a patent application entitled "Method of Autodiscriminating in Symbology Reader Employing Prioritized and Updated Table of Symbologies," U.S. application Ser. No. 09/006, 693, filed on Jan. 14, 1998, and assigned to a common assignee.

Aspects of the invention provide a system and method for controlling several ADC device platforms. The invention is particularly applicable to instrumented ADC device platforms, including hand-held devices, but is also applicable to other computing systems as well. Under aspects of the invention, a remote computing system having browsing software receives Hypertext Markup Language ("HTML") documents, Dynamic Hypertext Mark-Up Language ("DHTML") documents, Extensible Mark-Up Language ("XML") documents, and/or other documents containing ADC device computing applications over the World Wide Web. The remote computing system, such as the remote computing system 104, uses these ADC device computing applications to communicate with a network of ADC platform devices. The SNMP master agent 1229 communicates with the remote computing system 104, and a translator translates SNMP-formatted data sent to the ADC device platform 100 into a format suitable for reception by its ADC devices. Another translator translates data received from the ADC device into the SNMP format for transmission to the remote computing system. The SNMP master agent communicates with the remote computing system using the TCP, UDP/IP, or UDP+protocols. While the SNMP protocol specifies that it uses UDP, a variant of the SNMP protocol may be used with TCP.

The ADC platform device may also utilize a wireless communications system for all or a portion of its communications with the remote computing system. Embodiments of the invention provide a data communications network that uses Internet technology to deliver data from ADC devices to local and remote applications.

The ADC device network is scaleable from a minimal system having a few ADC device platforms to a large system with hundreds of ADC device platforms connected in a network. The minimal system requires only a low-cost personal computer ("PC") based web browser, while the larger system may utilize an existing communications infrastructure having a mixture of ADC devices.

According to one embodiment of the invention, the data communications network may use Java applets as the user interface to communicate data requests, including directions to the ADC data grid, to ADC device platforms. Java is an object-oriented programming language similar to C++. Java was designed to be secure and platform neutral, meaning that Java code may run on any computing platform. Java is a useful language for programming applications for the World Wide Web since users access the web from many different types of computers. Java is especially well adapted for use in programming small applications, or applets, for use in the World Wide Web. A Java applet may be loaded and run by an already running Java application, such as a web browser. Java applets may be downloaded and run by any web browser capable of interpreting Java, such as Microsoft Internet Explorer, Netscape Navigator, and Hot Java.

Although specific embodiments of, and examples for, the invention are described herein for illustrative purposes, various equivalent modifications are possible within the scope of the invention, as will be recognized by those skilled in the relevant art. The teachings provided herein of the invention can be applied to other data symbol imaging systems, not necessarily the exemplary ADC device platform having ADC devices described above. Various exemplary data symbol enablement systems, and accordingly, various other device input and output enablement systems can be employed under the invention. While the invention discusses bar code symbologies, the invention can similarly read visual indicia of other stored images. The ADC device platform may operate with protocols and languages in addition to those specifically disclosed herein. For example, the ADC device platform is not limited to operations using HTTP, HTML, DHTML, XML, UDP, TCP/IP, FTP, SNMP, and TFTP but is equally applicable to other similar languages and protocols. Similarly, applications used within the ADC device platform, such as the ADC data server, may be developed using an object oriented programming methodology or using any other programming methodology that results in a computing system having equivalent functionality.

Aspects of the invention can be applied to not only reading machine-readable symbols and other images, but also to transmitting such images to external devices, such as computerized servers and printers. The embodiments of the invention disclosed hereinabove have been discussed primarily with regard to hand-hand devices, such as hand-held data collection terminals. However, the invention finds equal applicability in stationary data collection terminals, such as a permanently mounted device, and in desktop personal computers.

All of the above U.S. patents and applications are incorporated by reference.

These and other changes can be made to the invention in light of the above detailed description. In general, in the following claims, the terms used should not be construed to limit the invention to the specific embodiments disclosed in the specification and the claims, but should be construed to include all ADC device platforms, data collection terminals, and data symbol imaging systems that operate under the claims set forth hereinbelow. Accordingly, the invention is not limited by the disclosure, but instead its scope is to be determined entirely by the following claims.

What is claimed is:

1. A method for routing a data set having characteristics, comprising:

receiving a data routing instruction for the at least one automatic data collection ("ADC") device from at least one client application;

analyzing the data routing instruction to determine if the data routing instruction specifies a data routing mechanism; and storing the data routing instruction in an output mechanism grid if the data routing instruction specifies a data output mechanism.

2. The method of claim 1, further comprising:

receiving the data set from the at least one ADC device for routing to the at least one client application; and examining the output mechanism grid to identify the data output mechanism for routing data from the at least one ADC device to the at least one client application.

3. The method of claim 1, further comprising:

receiving the data set from the at least one ADC device for routing to the at least one client application;

examining the output mechanism grid to identify the data output mechanism for routing data from the at least one ADC device to the at least one client application; and selecting a default output mechanism if the output mechanism grid does not identify an output mechanism for routing data from the at least one ADC device to the at least one client application.

4. The method of claim 1, further comprising:

receiving the data set from the at least one ADC device for routing to the at least one client application;

examining the output mechanism grid to identify the data output mechanism for routing data from the at least one ADC device to the at least one client application; and routing the data set to the at least one client application using the identified data output mechanism.

5. The method of claim 1, further comprising:

receiving the data set from the at least one ADC device for routing to the at least one client application; and examining the output mechanism grid to identify the data output mechanism for routing data from the at least one ADC device to the at least one client application, wherein the output mechanism grid for routing data from the at least one ADC device to the at least one client application includes as data output mechanisms at least one of pipes, remote procedure calls ("RPC"), sockets, network Basic Input/Output System ("NetBIOS"), mail slots, network Dynamic Data Exchange ("NetDDE"), and shared memory.

6. The method of claim 1, further comprising:
receiving the data set from the at least one ADC device for routing to the at least one client application; and
examining the output mechanism grid to identify the data output mechanism for routing data from the at least one ADC device to the at least one client application, wherein the data set is received by an ADC data server in an ADC device platform that contains the at least one ADC device, wherein the ADC data server also receives the data routing instruction for the at least one ADC device from the at least one client application.

7. The method of claim 1, further comprising:
receiving the data set from the at least one ADC device for routing to the at least one client application; and
examining the output mechanism grid to identify the data output mechanism for routing data from the at least one ADC device to the at least one client application, wherein the data set comprises one of bar code data, radio frequency ("RF") tag data, resonator data, Smart-Card data, magnetic stripe data, optical character recognition ("OCR") data, text data, ASCII data, AIMI-ECI data, two-dimensional data, dipole device data, and speech input data.

8. The method of claim 1, further comprising:
analyzing the data routing instruction to determine if the data routing instruction identifies a data type that may be received by the at least one client application from the at least one ADC device; and
storing the data routing instruction in an ADC data grid if the data routing instruction identifies a data type that may be received by the at least one client application.

9. The method of claim 1, further comprising:
analyzing the data routing instruction to determine if the data routing instruction identifies a data type that may be received by the at least one client application from the at least one ADC device;
storing the data routing instruction in an ADC data grid if the data routing instruction identifies a data type that may be received by the at least one client application;
receiving the data set having characteristics from the at least one ADC device;
identifying the characteristics of the data set; and
examining the ADC data grid to determine if the at least one client application should receive the data set by comparing the data routing instructions stored for the at least one client application in the ADC data grid with the identified characteristics of the data set.

10. The method of claim 1, further comprising:
analyzing the data routing instruction to determine if the data routing instruction identifies a data type that may be received by the at least one client application from the at least one ADC device;
storing the data routing instruction in an ADC data grid if the data routing instruction identifies a data type that may be received by the at least one client application; and
routing the data set to the at least one client application.

11. The method of claim 1, further comprising:
analyzing the data routing instruction to determine if the data routing instruction identifies a data type that may be received by the at least one client application from the at least one ADC device;
storing the data routing instruction in an ADC data grid if the data routing instruction identifies a data type that may be received by the at least one client application; and
identifying at least another client application to receive the data set using the identified characteristics.

12. The method of claim 1, further comprising:
analyzing the data routing instruction to determine if the data routing instruction identifies a data type that may be received by the at least one client application from the at least one ADC device;
storing the data routing instruction in an ADC data grid if the data routing instruction identifies a data type that may be received by the at least one client application; and
identifying at least another client application to receive the data set using the identified characteristics, wherein the at least one client application resides in an ADC device platform that contains the at least one ADC device and the at least another client application resides on a remote computing system.

13. The method of claim 1, further comprising:
analyzing the data routing instruction to determine if the data routing instruction identifies a data type that may be received by the at least one client application from the at least one ADC device;
storing the data routing instruction in an ADC data grid if the data routing instruction identifies a data type that may be received by the at least one client application; and
identifying at least another client application to receive the data set using the identified characteristics, wherein the at least one ADC device resides in an ADC device platform, the at least one client application resides on a remote computing system, and the at least another client application resides on another remote computing system.

14. The method of claim 1 wherein the at least one client application resides on a remote computing system, the method further comprising communicating with the remote computing system using one of the Transmission Control Protocol ("TCP"), the User Datagram Protocol ("UDP"), and the User Datagram Protocol Plus ("UDP+").

15. The method of claim 1, further comprising communicating with the at least one client application over at least one of an intranet, an internet, a local area network, a wide area network, and the World Wide Web.

16. The method of claim 1 wherein the at least one ADC device is one of a bar code reader, a radio frequency ("RF") tag reader, a resonator reader, a SmartCard reader, a magnetic stripe reader, an optical character recognition ("OCR") reader, a two-dimensional data reader, a dipole device reader, and a speech input recognizing device.

17. The method of claim 1, further comprising:
receiving a data reading instruction from the at least one client application for the at least one ADC device;
sending the data reading instruction to the at least one ADC device; and
receiving the data set from the at least one ADC device that performs the data reading instruction.

18. The method of claim 1, further comprising:

receiving a data reading instruction from the at least one client application for the at least one ADC device;

sending the data reading instruction to the at least one ADC device; and receiving the data set from the at least one ADC device that performs the data reading instruction, wherein the data set is received by an ADC data server that also receives the data reading instruction from the at least one client application and directs the translation of the data reading instruction into a native format of the at least one ADC device.

19. The method of claim 1, further comprising:

receiving a data reading instruction from the at least one client application for the at least one ADC device;

sending the data reading instruction to the at least one ADC device; and receiving the data set from the at least one ADC device that performs the data reading instruction, wherein the data set is received by an ADC data server that also receives the data reading instruction from the at least one client application and wherein the ADC data server directs a protocol handler and a device handler to translate the data reading instruction into a native format of the at least one ADC device.

20. A system for routing a plurality of data sets, comprising:

an automatic data collection ("ADC") data server that receives data sets having data characteristics from a plurality of ADC devices;

an output mechanism grid that contains routing mechanism instructions for at least one client application of a plurality of client applications; and an output method organizer that attempts to locate a routing mechanism instruction for each client application of the plurality of client applications that will receive a data set of the plurality of data sets from the ADC data server.

21. The system of claim 20, further comprising a data router that routes at least one data set of the plurality of data sets to at least one client application of the plurality of client applications using an output mechanism located in a routing mechanism instruction in the output mechanism grid.

22. The system of claim 20, further comprising a data router that routes at least one data set of the plurality of data sets to at least one client application of the plurality of client applications using an output mechanism located in a routing mechanism instruction in the output mechanism grid and wherein the output mechanism is one of pipes, remote procedure calls ("RPC"), sockets, mail slots, network Basic Input/Output System ("NetBIOS"), network Dynamic Data Exchange ("NetDDE"), and shared memory.

23. The system of claim 20 wherein the ADC data server resides in an ADC device platform that contains the plurality of ADC devices.

24. The system of claim 20 wherein each data set of the plurality of data sets comprises one of bar code data, radio frequency ("RF") tag data, resonator data, SmartCard data, magnetic stripe data, optical character recognition ("OCR") data, text data, ASCII data, AIMI-ECI data, two-dimensional data, dipole device data, and speech input data.

25. The system of claim 20 wherein at least one ADC device of the plurality of ADC devices is one of-a bar code reader, a radio frequency ("RF") tag reader, a resonator reader, a SmartCard reader, a magnetic stripe reader, an optical character recognition ("OCR") reader, a two-dimensional data reader, a dipole device reader, and a speech input recognizing device.

26. The system of claim 20, further comprising:

an ADC data grid that contains data type requests for the plurality of client applications; and an ADC grid data matcher that identifies the data type of each data set of the plurality of data sets and matches the identified data type against the data type requests for each client application of the plurality of client applications in the ADC data grid to determine if one or more than one client application should receive the data set.

27. The system of claim 20, further comprising:

an ADC data grid that contains data type requests for the plurality of client applications;

an ADC grid data matcher that identifies the data type of each data set of the plurality of data sets and matches the identified data type against the data type requests for each client application of the plurality of client applications in the ADC data grid to determine if one or more than one client application should receive the data set; and a data router that routes a data set of the plurality of data sets to at least one client application using an output mechanism located for the at least one client application in the output mechanism grid.

28. The system of claim 20, further comprising:

an ADC data grid that contains data type requests for the plurality of client applications;

an ADC grid data matcher that identifies the data type of each data set of the plurality of data sets and matches the identified data type against the data type requests for each client application of the plurality of client applications in the ADC data grid to determine if one or more than one client application should receive the data set; and a data router that routes a data set of the plurality of data sets to at least one client application using an output mechanism located for the at least one client application in the output mechanism grid, wherein the output mechanism for routing the data set to the at least one client application is one of pipes, remote procedure calls ("RPC"), sockets, mail slots, network basic input/output system ("NetBIOS"), network dynamic data exchange ("NetDDE"), and shared memory.

29. The system of claim 20, further comprising:

an ADC data grid that contains data type requests for the plurality of client applications; and an ADC grid data matcher that identifies the data type of each data set of the plurality of data sets and matches the identified data type against the data type requests for each client application of the plurality of client applications in the ADC data grid to determine if one or more than one client application should receive the data set, wherein the grid data matcher identifies more than one client application of the plurality of client applications to receive the data set based upon examination of the ADC data grid.

30. The system of claim 20 wherein at least one client application to receive the data set resides in an ADC device platform that contains the at least one ADC device and at least another client application to receive the data set resides on a remote computing system.

31. The system of claim 20 wherein the ADC data server and the plurality of ADC devices reside in an ADC device platform, at least one client application to receive the data set resides on a remote computing system, and at least another client application to receive the data set resides in another remote computing system.

32. The system of claim 20 wherein the ADC data server and the plurality of ADC devices reside in an ADC device platform, and the at least one client application to receive the data set resides on a remote computing system, and the ADC device platform communicates with the remote computing system using one of the Transmission Control Protocol ("TCP"), the User Datagram Protocol ("UDP"), and the User Datagram Protocol Plus ("UDP+").

33. The system of claim 20 wherein the ADC data server and the plurality of ADC devices reside in an ADC device platform, and the at least one client application to receive the data set resides on a remote computing system, and communications between the at least one client application and the ADC device platform pass over at least one of an intranet, an internet, a local area network, a wide area network, and the World Wide Web.

34. An automatic data collection ("ADC") network that routes data, comprising:
   a plurality of ADC device platforms, such that at least one ADC device platform comprises:
      at least one ADC device;
      an ADC data server that receives a plurality of data sets having characteristics from the at least one ADC device;
      an output mechanism grid that contains routing mechanism instructions for a plurality of client applications; and
      an output method organizer that attempts to locate a routing mechanism instruction for each client application that will receive a data set of the plurality of data sets from the ADC data server.

35. The system of claim 34, further comprising a data router in the at least one ADC device platform that routes a data set of the plurality of data sets to a client application of the plurality of client applications using an output mechanism located in a routing mechanism instruction in the output mechanism grid of the at least one ADC device platform.

36. The system of claim 34 wherein the output mechanism for routing a data set to at least one client application is one of pipes, remote procedure calls ("RPC"), sockets, mail slots, network basic input/output system ("NetBIOS"), network dynamic data exchange ("NetDDE"), and shared memory.

37. The system of claim 34 wherein at least one data set of the plurality of data sets comprises one of bar code data, radio frequency ("RF") tag data, resonator data, SmartCard data, magnetic stripe data, optical character recognition ("OCR") data, text data, ASCII data, AIMI-ECI data, two-dimensional data, dipole device data, and speech input data.

38. The system of claim 34 wherein the at least one ADC device of at least one ADC device platform is one of a bar code reader, a radio frequency ("RF") tag reader, a resonator reader, a SmartCard reader, a magnetic stripe reader, an optical character recognition ("OCR") reader, a two-dimensional data reader, a dipole device reader, and a speech input recognizing device.

39. The system of claim 34 wherein the at least one ADC device platform further comprises:
   an ADC data grid that contains data type requests for the plurality of client applications; and
   an ADC grid data matcher that identifies the data type of each data set received from the ADC device and matches the identified data types against the data type requests for each client application of the plurality of client applications in the ADC data grid to determine if one or more than one client application should receive the data set.

40. The system of claim 34 wherein the at least one ADC device platform further comprises:
   an ADC data grid that contains data type requests for the plurality of client applications;
   an ADC grid data matcher that identifies the data type of each data set received from the ADC device and matches the identified data types against the data type requests for each client application of the plurality of client applications in the ADC data grid to determine if one or more than one client application should receive the data set; and
   a data router that routes a data set of the data sets to at least one client application using an output mechanism located for the at least one client application in the output mechanism grid.

41. The system of claim 34 wherein the at least one ADC device platform further comprises:
   an ADC data grid that contains data type requests for the plurality of client applications;
   an ADC grid data matcher that identifies the data type of each data set received from the ADC device and matches the identified data types against the data type requests for each client application of the plurality of client applications in the ADC data grid to determine if one or more than one client application should receive the data set; and
   a data router that routes a data set of the data sets to at least one client application using an output mechanism located for the at least one client application in the output mechanism grid, wherein the output mechanism for routing the data set to the at least one client application is one of pipes, remote procedure calls ("RPC"), sockets, mail slots, network basic input/output system ("NetBIOS"), network dynamic data exchange ("NetDDE"), and shared memory.

42. The system of claim 34 wherein the at least one ADC device platform further comprises:
   an ADC data grid that contains data type requests for the plurality of client applications; and
   an ADC grid data matcher that identifies the data type of each data set received from the ADC device and matches the identified data types against the data type requests for each client application of the plurality of client applications in the ADC data grid to determine if one or more than one client application should receive the data set, wherein the grid data matcher identifies more than one client application of the plurality of client applications to receive a data set based upon examination of the ADC data grid.

43. The system of claim 34 wherein at least one ADC data device platform further comprises:
   an ADC data grid that contains data type requests for the plurality of client applications; and
   an ADC grid data matcher that identifies the data type of each data set received from the ADC device and matches the identified data types against the data type requests for each client application of the plurality of client applications in the ADC data grid to determine if one or more than one client application should receive the data set, wherein the grid data matcher identifies more than one client application of the plurality of client applications to receive a data set based upon examination of the ADC data grid, and wherein at least one identified client application resides in the ADC device platform and at least another identified client application resides on a remote computing system.

44. The system of claim 34 wherein at least one ADC device platform further comprises:

an ADC data grid that contains data type requests for the plurality of client applications; and an ADC grid data matcher that identifies the data type of each data set received from the ADC device and matches the identified data types against the data type requests for each client application of the plurality of client applications in the ADC data grid to determine if one or more than one client application should receive the data set, wherein the grid data matcher identifies more than one client application of the plurality of client applications to receive a data set based upon examination of the ADC data grid and wherein the at least one identified client application resides on a remote computing system and at least another identified client application resides in another remote computing system.

45. The system of claim 34 wherein the at least one ADC device platform further comprises:

an ADC data grid that contains data type requests for the plurality of client applications; and an ADC grid data matcher that identifies the data type of each data set received from the ADC device and matches the identified data types against the data type requests for each client application of the plurality of client applications in the ADC data grid to determine if one or more than one client application should receive the data set, wherein the the at least one identified client application resides on a remote computing system and the ADC device platform communicates with the remote computing system using one of the Transmission Control Protocol ("TCP"), the User Datagram Protocol ("UDP"), and the User Datagram Protocol Plus ("UDP+").

46. The system of claim 34 wherein the at least one ADC device platform further comprises:

an ADC data grid that contains data type requests for the plurality of client applications; and an ADC grid data matcher that identifies the data type of each data set received from the ADC device and matches the identified data types against the data type requests for each client application of the plurality of client applications in the ADC data grid to determine if one or more than one client application should receive the data set, wherein the at least one identified client application resides on a remote computing system and communications between the at least one identified client application and the ADC device platform pass over at least one of an intranet, an internet, a local area network, a wide area network, and the World Wide Web.

* * * * *